(12) United States Patent
Wakabayashi et al.

(10) Patent No.: US 7,871,091 B2
(45) Date of Patent: Jan. 18, 2011

(54) STEERING DAMPER APPARATUS AND DAMPER APPARATUS

(75) Inventors: Takeshi Wakabayashi, Niza (JP); Yotaro Mori, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 624 days.

(21) Appl. No.: 11/704,188

(22) Filed: Feb. 9, 2007

(65) Prior Publication Data

US 2007/0216124 A1 Sep. 20, 2007

(30) Foreign Application Priority Data

Feb. 14, 2006 (JP) .............................. 2006-037241

(51) Int. Cl.
*B62D 7/22* (2006.01)
*F16F 15/10* (2006.01)
(52) U.S. Cl. ..................... 280/89; 464/180; 188/290
(58) Field of Classification Search ............ 280/89, 280/90; 188/290; 464/180; 74/551.1
See application file for complete search history.

(56) References Cited

U.S. PATENT DOCUMENTS

| | | | | | |
|---|---|---|---|---|---|
| 927,735 | A | * | 7/1909 | Lemp ........................ | 280/90 |
| 1,572,519 | A | * | 2/1926 | Davis ........................ | 74/492 |
| 1,787,319 | A | * | 12/1930 | McDonald ................ | 180/447 |
| 4,352,304 | A | * | 10/1982 | Warner ..................... | 74/498 |
| 6,120,046 | A | * | 9/2000 | Daly ......................... | 280/90 |
| 6,729,447 | B2 | * | 5/2004 | Takahashi ................ | 188/291 |
| 7,380,804 | B2 | * | 6/2008 | Lee .......................... | 280/90 |

FOREIGN PATENT DOCUMENTS

| | | |
|---|---|---|
| JP | 07-165148 | 6/1995 |
| JP | 2004-239363 | * 8/2004 |

* cited by examiner

*Primary Examiner*—Paul N Dickson
*Assistant Examiner*—Timothy D Wilhelm
(74) *Attorney, Agent, or Firm*—Birch, Stewart, Kolasch & Birch, LLP

(57) ABSTRACT

A steering damper apparatus includes: a body frame; wheels suspended by the body frame; a steering shaft rotatably supported by the body frame, one end of the steering shaft being connected to the wheel side; a handlebar connected to the other end of the steering shaft for rotating the steering shaft to steer the wheels; and a damper for damping the rotation of the steering shaft. The rotation of the steering shaft is damped by the damper only when there is an input from either the handlebar or the wheels.

16 Claims, 18 Drawing Sheets

STEERING DAMPER APPARATUS AND DAMPER APPARATUS

BACKGROUND OF THE INVENTION

1. Field of the Invention

The present invention relates to a steering damper apparatus that generates a damping force in a steering system of a vehicle, and a damper apparatus that provides a damping force to input torque.

This patent application claims priority on Japanese Patent Application No. 2006-037241 filed on Feb. 14, 2006, the disclosure of which is incorporated herein by reference.

2. Background Art

In the past, there was a known steering damper apparatus constructed in a structure in which a damper is mounted in a steering system of a vehicle such that the rotation of the steering system caused due to the irregularity of a road surface can be damped by the damper (For example, see JP-A No. H07-165148).

In the steering damper apparatus, however, the damper performs the damping operation equally irrespective of whether the force inputted to the steering system is the force from a handlebar or the force from the road surface. As a result, for example, when the damping force is not provided to the input from the handlebar, or when information from the road surface is directly transmitted to the handlebar, and, in addition, a rider wishes to obtain a sensation of the handlebar manipulation, it is not possible to meet various demands of the rider.

SUMMARY OF THE INVENTION

Consequently, the present invention provides a steering damper apparatus and a damper apparatus that are capable of providing a damping force only to an input torque from one side and transmitting it to the other side.

In order to address the problem, the present invention provides a steering damper apparatus including a body frame (for example, a body frame 2 in embodiments), wheels (for example, front wheels 3 in embodiments) suspended by the body frame, a steering shaft (for example, a steering shaft 45 in embodiments) rotatably supported by the body frame, one end of the steering shaft being connected to the wheel side, a handlebar (for example, a handlebar 46 in embodiments) connected to the other end of the steering shaft for rotating the steering shaft to steer the wheels, and a damper (for example, a damper 51, 151 in embodiments) for damping the rotation of the steering shaft, wherein the rotation of the steering shaft is damped by the damper only when there is an input from either the handlebar or the wheels.

Furthermore, the present invention provides a steering damper apparatus including a body frame (for example, a body frame 2 in embodiments), wheels (for example, front wheels 3 in embodiments) suspended by the body frame, a handlebar (for example, a handlebar 46 in embodiments) for steering the wheels, and a damper (for example, a damper 51, 151 in embodiments) for damping the rotation of the handlebar, wherein the steering damper apparatus further includes an input torque selecting mechanism (for example, an input torque selecting mechanism 52, 152 in embodiments) having an input shaft (for example, an input shaft 71, 171 in embodiments), an output shaft (for example, an output shaft 72, 172 in embodiments), and a housing (for example, a housing 67, 167 in embodiments) for rotatably supporting the respective shafts, the input torque selecting mechanism being constructed such that, when a torque is inputted from the input shaft, the input shaft rotates the output shaft relative to the housing, and, on the other hand, when a torque is inputted from the output shaft, the output shaft rotates the input shaft and the housing, and wherein one of the input shaft and the output shaft of the input torque selecting mechanism is connected to the handlebar side, the other of the input shaft and the output shaft of the input torque selecting mechanism is connected to the wheel side, the housing is connected to the damper, the respective shafts are rotated to steer the wheels, and, when the housing is rotated, the rotation of the housing is damped by the damper.

The above-mentioned steering damper apparatus may be constructed such that the damper and the housing of the input torque selecting mechanism are connected with each other via gears (gears 157*a* and 167*a* in embodiments).

The above-mentioned steering damper apparatus may be constructed such that the steering damper apparatus further includes a steering shaft (for example, a steering shaft 45 in embodiments) rotatably supported by the body frame, one end of the steering shaft being connected to the wheel side, the other end of the steering shaft being connected to the handlebar side, and at least a portion of the steering shaft constitutes the input shaft or the output shaft of the input torque selecting mechanism.

The above-mentioned steering damper apparatus may be constructed such that the input shaft of the input torque selecting mechanism is connected to the handlebar side.

The above-mentioned steering damper apparatus may be constructed such that the input shaft of the input torque selecting mechanism is connected to the wheel side.

The above-mentioned steering damper apparatus may be constructed such that the steering damper apparatus further includes a steering shaft (for example, a steering shaft 45 in embodiments) rotatably supported by the body frame, one end of the steering shaft being connected to the wheel side, the other end of the steering shaft being connected to the handlebar side, and the steering shaft includes an upper shaft (for example, a steering shaft 45*a* in embodiments) connected to the handlebar side, and a lower shaft (for example, a steering shaft 45*b* in embodiments) connected to the wheel side, the upper and lower shafts being respectively connected to either the input or output shaft of the input torque selecting mechanism via gears (for example, gears 45*c*, 45*d*, 171*a*, 172*a*, 173*a*, 173*b*, 174*a*, and 174*b* in embodiments).

The above-mentioned steering damper apparatus may be constructed such that one of the input and output shafts of the input torque selecting mechanism includes a protrusion (for example, a protrusion 73*b* in embodiments), and the other of the input and output shafts of the input torque selecting mechanism includes a depression (for example, a depression 74*b* in embodiments) in which the protrusion is loosely fitted with a predetermined space (for example, a space S1 in embodiments) therebetween, and when the input and output shafts rotate relative to each other, the protrusion and the depression are brought into abutment with each other so that torque is transmitted between the upper and lower shafts of the steering shaft via the protrusion and the depression.

The above-mentioned steering damper apparatus may be constructed such that the speeds of rotation of the upper and lower shafts of the steering shaft are increased by the gears before being transmitted to the input and output shafts of the input torque selecting mechanism.

The above-mentioned steering damper apparatus may be constructed such that the upper and lower shafts of the steering shaft are coupled to each other via an elastic member (for example, a torsion bar 175 in embodiments) whose torsional spring constant is lower than that of the upper and lower shafts.

The above-mentioned steering damper apparatus may be constructed such that the input and output shafts of the input torque selecting mechanism are coupled to each other via an elastic member (for example, a torsion bar 176 in embodiments) whose torsional spring constant is lower than that of the input and output shafts.

The above-mentioned steering damper apparatus may be constructed such that one of the upper and lower shafts of the steering shaft includes a steering-side protrusion (for example, a steering-side protrusion 177 in embodiments), and the other of the upper and lower shafts of the steering shaft includes a steering-side depression (for example, a steering-side depression 178 in embodiments) in which the steering-side protrusion is loosely fitted with a predetermined space (for example a space S3 in embodiments) therebetween, and when the upper and lower shafts rotate relative to each other, the steering-side protrusion and the steering-side depression are brought into abutment with each other so that torque is transmitted between the upper and lower shafts via the steering-side protrusion and the steering-side depression.

The above-mentioned steering damper apparatus may be constructed such that the input torque selecting mechanism has positioning means (for example, a mechanism-side positioning mechanism 182, 182' in embodiments) for determining a neutral position in a rotating direction between the input and output shafts.

The above-mentioned steering damper apparatus may be constructed such that the steering shaft has steering-side positioning means (for example, a steering-side positioning mechanism 181, 181' in embodiments) for determining a neutral position in a rotating direction between the upper and lower shafts.

Furthermore, the present invention provides a steering damper apparatus including: a body frame (for example, a body frame 2 in embodiments); wheels (for example, front wheels 3 in embodiments) suspended by the body frame; a handlebar (for example, a handle bar 46 in embodiments) for steering the wheels; a steering shaft (for example, a steering shaft 45 in embodiments) rotatably supported by the body frame, one end and the other end of the steering shaft being connected to the wheel side and the handlebar side, respectively; and a damper (for example, a damper 151 in embodiments) for damping the rotation of the handlebar. The steering damper apparatus further includes an input torque selecting mechanism (for example, an input torque selecting mechanism 152 in embodiments) having an input shaft, an output shaft (for example, an input shaft 171 and an output shaft 172 in embodiments), and a housing (for example, a housing 167 in embodiments) for rotatably supporting the respective shafts, the input torque selecting mechanism being constructed such that, only when a torque is inputted from one of the input and output shafts, the one of the input and output shafts rotates the housing. The steering shaft includes an upper shaft (for example, an upper shaft 45a in embodiments) connected to the handlebar side, and a lower shaft (for example, a lower shaft 45b in embodiments) connected to the wheel side, the upper and lower shafts being respectively connected to either the input or output shaft of the input torque selecting mechanism via gears (for example, gears 45c, 45d, 171a, 172a, 173a, 173b, 174a, and 174b in embodiments), the damper is connected to the housing, and when the housing is rotated, the rotation of the housing is damped by the damper. One of the upper and lower shafts includes a steering-side protrusion (for example, a steering-side protrusion 177 in embodiments), and the other of the upper and lower shafts includes a steering-side depression (for example, a steering-side depression 178 in embodiments) in which the steering-side protrusion is loosely fitted with a predetermined space (for example, a space S3 in embodiments) therebetween, the steering-side protrusion and the steering-side depression being brought into abutment with each other when the upper and lower shafts rotate relative to each other, so that torque is transmitted between the upper and lower shafts via the steering-side protrusion and the steering-side depression.

Furthermore, the present invention provides a damper apparatus including: an input torque selecting mechanism (for example, the input torque selecting mechanism 52, 152 in embodiments), which has an input shaft, an output shaft (for example, an input shaft 71, 171 and an output shaft 72, 172 in embodiments), and a housing (for example, a housing 67, 167 in embodiments) for rotatably supporting the respective shafts, the input torque selecting mechanism being constructed such that, when a torque is inputted from the input shaft, the input shaft rotates the output shaft relative to the housing, and when a torque is inputted from the output shaft, the output shaft rotates the input shaft and the housing; and a damper (for example, a damper 51, 151 in embodiments) connected to the housing for damping the rotation of the housing.

The above-mentioned damper apparatus may be constructed such that the damper apparatus further includes a shaft (for example, a steering shaft 45 in embodiments) disposed in a non-coaxial manner with respect to the input shaft and the output shaft, the shaft is divided into upper and lower shafts (for example, upper and lower shafts 45a and 45b in embodiments), and the upper and lower shafts are respectively connected to either the input or output shaft of the input torque selecting mechanism via gears (for example, gears 45c, 45d, 171a, 172a, 173a, 173b, 174a, and 174b in embodiments).

The above-mentioned damper apparatus may be constructed such that one of the input and output shafts of the input torque selecting mechanism includes a protrusion (for example, a protrusion 73b in embodiments), and the other of the input and output shafts of the input torque selecting mechanism includes a depression (for example, a depression 74b in embodiments) in which the protrusion is loosely fitted with a predetermined space (for example, a space S1 in embodiments) therebetween, the protrusion and the depression being brought into abutment with each other when the input and output shafts rotate relative to each other, so that torque is transmitted between the upper and lower shafts via the protrusion and the depression. On the other hand, one of the upper and lower shafts includes a shaft-side protrusion (for example, a shaft-side protrusion 177 in embodiments), and the other of the upper and lower shafts includes a shaft-side depression (for example, a shaft-side depression 178 in embodiments) in which the shaft-side protrusion is loosely fitted with a predetermined space (for example, a space S3 in embodiments) therebetween, the shaft-side protrusion and the shaft-side depression being brought into abutment with each other when the upper and lower shafts rotate relative to each other, so that torque is transmitted between the upper and lower shafts also via the shaft-side protrusion and the shaft-side depression.

The above-mentioned damper apparatus may be constructed such that the input torque selecting mechanism has positioning means (for example, a mechanism-side positioning mechanism 182, 182' in embodiments) for determining a neutral position in a rotating direction between the input and output shafts.

The present invention has the effect of generating a damping force of the damper only when there is an input from either the handlebar or the wheels and meeting to various steering characteristics desired by a rider, for example, when no damping force is applied to the manipulation of the handlebar or when information from a road surface is directly transmitted to the handlebar and, in addition, the rider wishes to obtain a sensation of the handlebar manipulation.

The present invention has the effect of relatively freely disposing the damper at the circumference of the input torque selecting mechanism and easily changing the damping characteristics through the change of a gear ratio.

The present invention has the effect of effectively using the input shaft and the output shaft of the input torque selecting mechanism as the steering shaft.

The present invention has the effect of transmitting an input from the handlebar to the wheel side without the generation of a damping force, thereby keeping the steering of the handlebar light and smooth. On the other hand, the invention has the effect of transmitting an input from the road surface to the handlebar side with the generation of a damping force, thereby effectively restraining the rotation of a steering system caused due to the irregularity of the road surface.

Furthermore, the present invention has the effect of directly transmitting an input from the road surface to the handlebar side without the generation of a damping force, thereby accurately transmitting information from the road surface to a rider. On the other hand, the invention has the effect of transmitting an input from the handlebar to the wheel side with the generation of a damping force, thereby providing a good sensation of the handlebar manipulation.

Furthermore, the present has the effect of applying a damping force to the rotation thereof only when there is an input from the output shaft.

Furthermore, the present invention has the effect of relatively freely disposing the input torque selecting mechanism at the circumference of the steering shaft. In addition, the present invention has the effect of setting the speed of transmission of rotation constant between the upper and lower shafts of the steering shaft, and increasing or reducing the speed of transmission of rotation between the input and output shafts of the input torque selecting mechanism, and the steering shaft as appropriate through the setting of a gear ratio.

Furthermore, the present has the following effect. That is, when performing the transmission of torque between the upper and lower shafts of the steering shaft via the protrusion and depression of the input torque selecting mechanism, play based on the space between the protrusion and the depression is produced between the upper and lower shafts with respect to the rotational direction. At this time, since the rotation of the steering shaft is increased in speed via the above-mentioned gears before being transmitted to the input torque selecting mechanism (that is, the rotations of the input and output shafts of the input torque selecting mechanism are reduced in speed before being transmitted to the steering shaft), the play between the upper and lower shafts based on the above-mentioned space with respect to the rotational direction can be kept small.

Furthermore, the present invention has the effect of causing the torsional reaction force of the torsion bar to be exerted at the time of relative rotation between the upper and lower shafts, thereby making it possible to maintain good steering feel for the rider.

Furthermore, the present invention has the effect of allowing torque to be transmitted between the upper and lower shafts also via the steering-side protrusion and steering-side depression of the steering shaft in addition to the protrusion and depression of the input torque selecting mechanism, so the load applied to, in particular, the projection of the input torque selecting mechanism is suppressed, whereby the performance required of the input torque selecting mechanism can be reduced to achieve a reduction in size and weight as well as a reduction in cost.

Furthermore, the present invention has the following effect. That is, by assembling the steering damper unit in the state where the neutral position in the rotating direction of the input and output shafts of the input torque selecting mechanism is determined and also the neutral position in the rotating direction of the upper and lower shafts of the steering shaft is determined, even when, in particular, the steering shaft and the input torque selecting mechanism are disposed in a non-coaxial manner, it is possible to prevent a rotational phase difference (displacement of the neutral position) from occurring between the steering shaft and the input torque selecting mechanism.

Furthermore, the present invention has the effect of allowing a damping force of the damper to be generated only when there is an input from either the handlebar or the wheels, thereby making it possible to meet various steering characteristics desired by a rider. Furthermore, by performing the transmission of torque between the upper and lower shafts via the steering-side protrusion and steering-side depression of the steering shaft, the performance required of the input torque selecting mechanism particularly in terms of strength with respect to the transmission torque can be reduced, thereby achieving a reduction in the size and weight of the input torque selecting mechanism as well as a reduction in cost.

Furthermore, the present invention has the effect of relatively freely disposing the input torque selecting mechanism at the circumference of the shaft. In addition, the present invention has the effect of setting the speed of transmission of rotation constant between the upper and lower shafts of the shaft, and increasing or reducing the speed of transmission of rotation between the input and output shafts of the input torque selecting mechanism, and the steering shaft as appropriate through the setting of a gear ratio.

Furthermore, the present invention has the effect of allowing torque to be transmitted between the upper and lower shafts also via the shaft-side protrusion and shaft-side depression of the shaft in addition to the protrusion and depression of the input torque selecting mechanism, so the load applied to, in particular, the projection of the input torque selecting mechanism is suppressed, whereby the performance required of the input torque selecting mechanism can be reduced to achieve a reduction in size and weight as well as a reduction in cost.

Furthermore, the present invention has the following effect. That is, by assembling the steering damper unit in the state where the neutral position in the rotating direction of the input and output shafts of the input torque selecting mechanism is determined, even when the steering shaft and the input torque selecting mechanism are disposed in a non-coaxial manner, it is possible to prevent a rotational phase difference (displacement of the neutral position) from occurring between the shaft and the input torque selecting mechanism.

BRIEF DESCRIPTION OF THE DRAWINGS

FIGS. 4A to 4C are sectional views taken along the line B-B of FIG. 3, of which FIG. 4A shows a neutral state in which torque is not inputted to respective shafts, FIG. 4B shows a state in which torque from an input shaft is inputted, and FIG. 4C shows a state in which torque from an output shaft is inputted.

DESCRIPTION OF THE PREFERRED EMBODIMENTS

Figure 1:
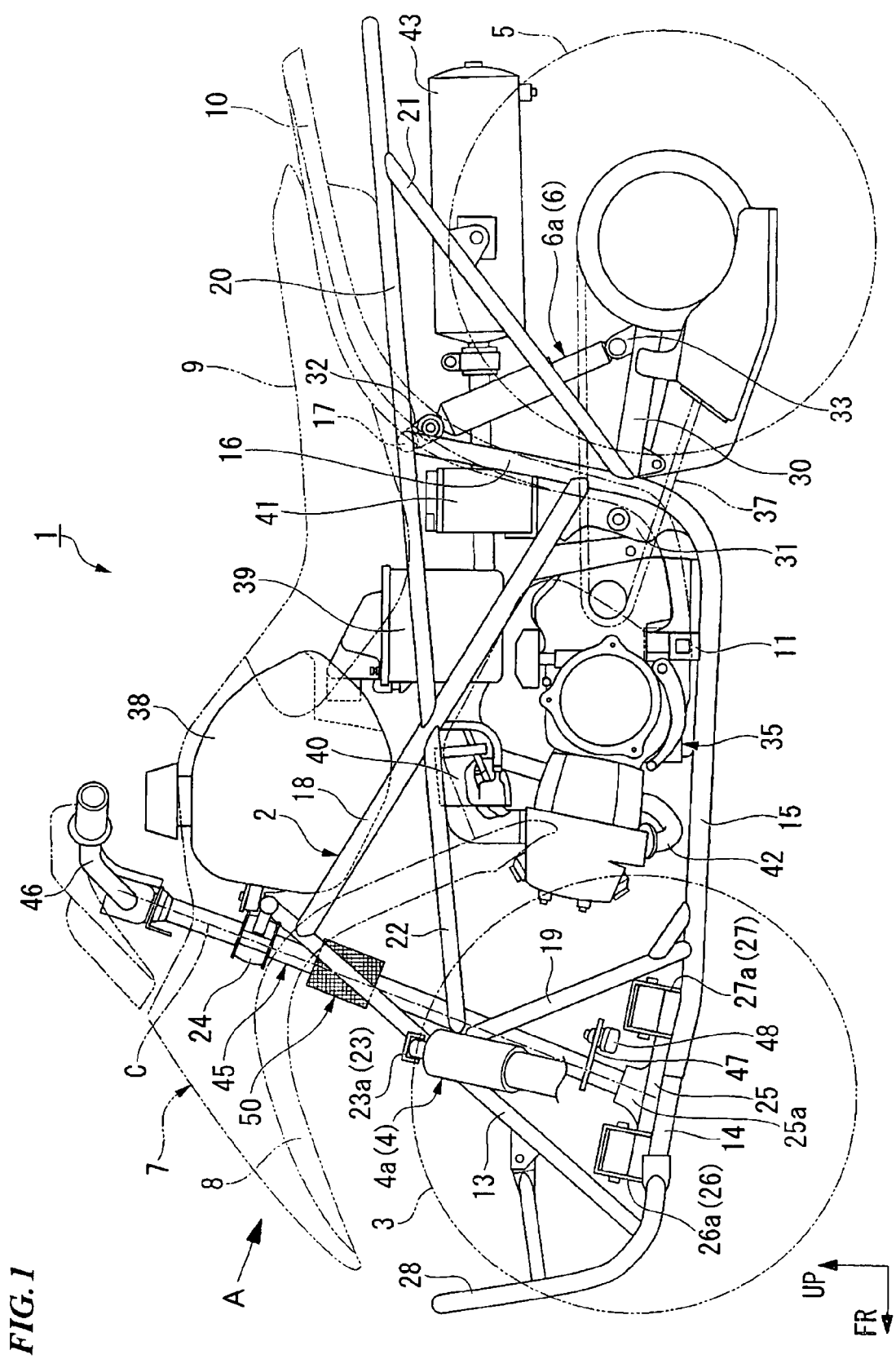
FIG. 1 is a side view of a saddle-ride type four-wheeled vehicle according to an embodiment of the present invention.

Hereinafter, embodiment of the present invention will be described with reference to the accompanying drawings. In the following description, directions, such as front, rear, left, and right, are the same as directions of a vehicle unless the directions are particularly indicated. Also, in the drawings, the arrow FR indicates the front of the vehicle, the arrow LH indicates the left of the vehicle, and the arrow UP indicates the upper side of the vehicle.

Embodiment 1

A saddle-ride type four-wheeled vehicle 1 as an all terrain vehicle is shown in FIG. 1. Left- and right-side front wheels 3 are suspended from the front part of a body frame 2 positioned at the middle in the vehicle width direction (the lateral direction) via an independent suspension type front suspension 4. Left- and right-side rear wheels 5 are suspended from the rear part of the body frame 2 via an axle suspension type rear suspension 6. The first half upper part of the body frame 2 is covered by a body cover 7. At both the left and right sides of the body cover 7 are mounted front fenders 8, respectively. At rear of the body frame 7 is disposed a seat 9. At both the left and right sides of the seat 9 are mounted rear fenders 10, respectively. Below the seat 9 is mounted a stepper 11, which protrudes to the left and right sides.

At the front part of the body frame 2 are disposed a pair of left- and right-side front pipes 13, which are inclined forward and rearward. To the lower ends of the respective front pipes 13 are connected front lower pipes 14, which approximately horizontally extend rearward. To the rear parts of the respective front lower pipes 14 are connected lower pipes 15, which extend rearward. The rear parts of the respective lower pipes 15 are bent upward to form left- and right-side center pipes 16. Between the upper ends of the respective center pipes 16 is connected via a cross pipe 17, which extends to the left and right sides.

Between the upper ends of the respective front pipes 13 and the middle parts of the respective center pipes 16 are disposed left- and right-side main pipes 18, which are arranged such that the rear ends of the respective left- and right-side main pipes 18 are lowered. Between the middle parts of the respective front pipes 13 and the front parts of the respective lower pipes 15 are disposed front side pipes 19, which are arranged such that the rear ends of the respective front side pipes 19 are lowered. To the middle parts of the main pipes 18 are joined the front ends of left- and right-side seat rail pipes 20, respectively. The respective seat rail pipes 20 linearly extend rearward from the main pipes 18 through the upper ends of the center pipes 16 (the opposite ends of the cross pipe 17). Between the rear parts of the respective seat rail pipes 20 and the lower parts of the respective center pipes 16 are disposed left- and right-side reinforcing pipes 21. Between the upper ends of the respective front side pipes 19 and the middle parts of the respective main pipes 18 are disposed left- and right-side reinforcing pipes 22, which are arranged in the same line as the respective seat rail pipes 20.

Figure 2:
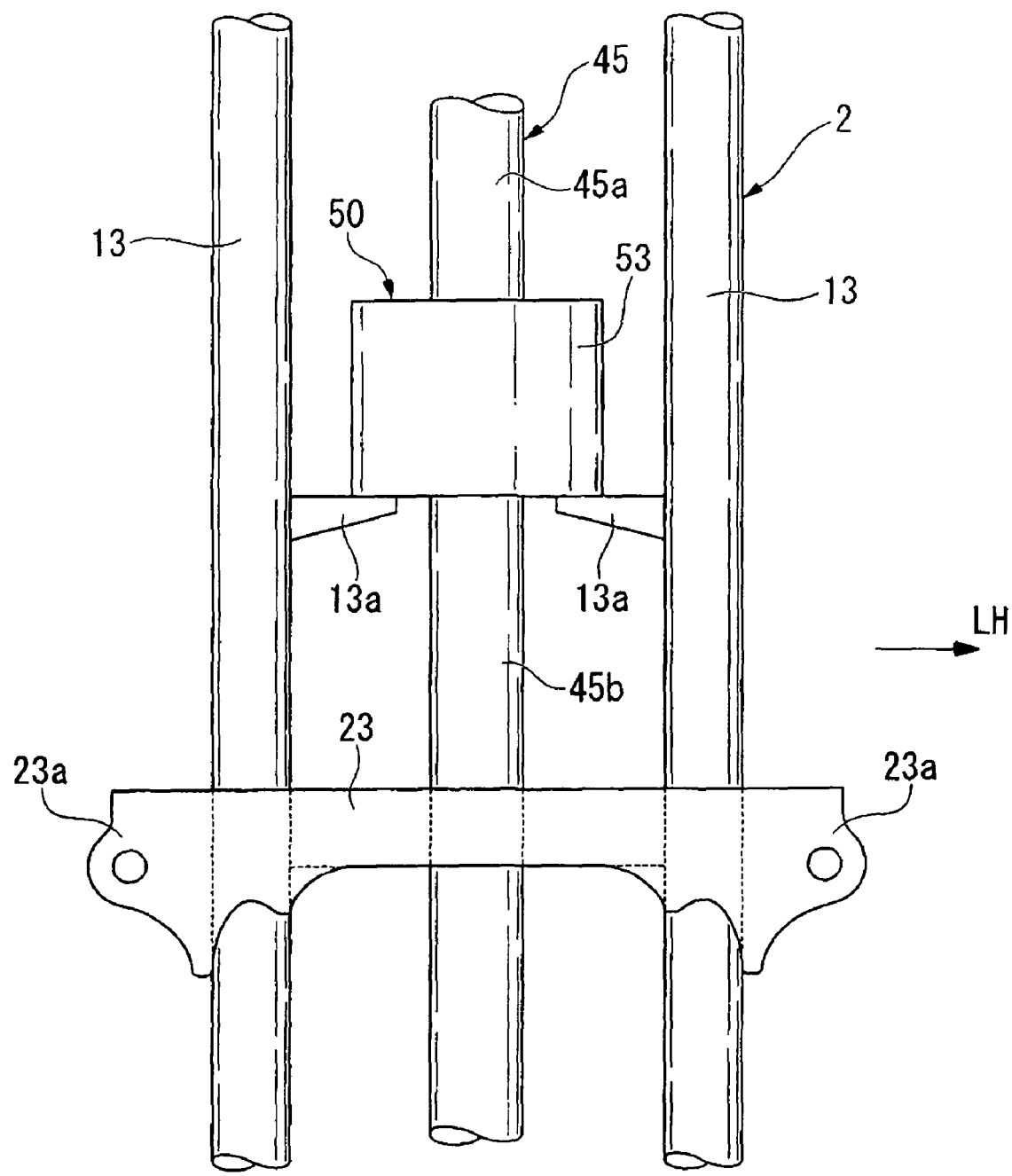
FIG. 2 is a view taken in the direction indicated by the arrow A of FIG. 1.

Reference is also made to FIG. 2, a cross member 23 is mounted to the left- and right-side front pipes 13 between the vicinities of the coupling parts between the left- and right-side front pipes 13 and the front side pipes 19 in such a manner that the cross member 23 extends to the left and right sides. At both the left and right ends of the cross member 23 are mounted upper end supporting parts 23a for supporting the upper ends of front cushions 4a. Between the upper ends of the respective front pipes 13 is disposed a cross stay 24, which extends to the left and right sides. Between the respective lower pipes 15 are disposed a cross plate 25 and cross members 26 and 27, which extend to the left and right sides in front of the front side pipes 19. At both the left and right ends of the respective cross members 26 and 27 are mounted arm supporting parts 26a and 27a that support the bases of suspension arms for suspending the front wheels 3. The lower ends of front bumpers 28 are supported by the tip ends of the respective front lower pipes 14.

At the front sides of the lower parts of the respective center pipes 16 are mounted left- and right-side pivot brackets 31 for supporting the front end of a rear swing arm 30, respectively. The rear end of the rear swing arm 30 is journalled to the respective rear wheels 5 via an axle, which extends to the left and right sides. At the middle part of the cross pipe 17 is mounted a bracket 32 for supporting the upper end of a rear cushion 6a. At the middle of the rear part of the rear swing arm 30 is mounted a bracket 33 for supporting the lower end of the rear cushion 6a.

Inside the body frame 2 is mounted an engine 35, which is a prime motor of the saddle-ride type four-wheeled vehicle 1. The output from the engine 35 is transmitted to the left- and right-side rear wheels 5 via an endless chain 37 running around the output shaft of the engine 35 and the axle of the rear wheels 5.

Above the front parts of the main pipes 18 is disposed a fuel tank 38. At the rear of the fuel tank 38 is disposed an air cleaner case 39, which is lower than the fuel tank 38. To the front part of the air cleaner case 39 is connected the upstream side of a carburetor 40, and the downstream side of the carburetor 40 is connected to an intake port of the engine 35. At the rear of the air cleaner case 39 is disposed a battery 41. An exhaust pipe 42 extends downward from a cylinder part of the front part of the engine 35. The exhaust pipe 42 is curved to the right side of the cylinder part, extends upward, and is then bent rearward. The exhaust pipe 42 is connected to a silencer 43, which is disposed at the right side of the rear part of the vehicle body.

At the middle of the front part of the body frame 2 is mounted a steering shaft 45, which vertically extends through the body frame 2. The upper part of the steering shaft 45 is supported by the cross stay 24, and the lower end of the steering shaft 45 is supported by a steering lower holder 25a disposed at the middle of the cross plate 25.

The steering shaft 45 vertically extends in a straight line at the middle of the front part of the vehicle body in the lateral direction. The steering shaft 45 is slightly inclined such that the upper side of the steering shaft 45 is located at the rear. The steering shaft 45 is supported by the body frame 2 such that the steering shaft 45 can be rotated about the axis of the steering shaft 45. To the upper end of the steering shaft 45 is attached a bar-type handlebar 46 via a holder. On the other hand, one end of each left- and right-side tie rods 48 is connected to the lower end of the steering shaft 45 via a center arm 47. The other end of each left- and right-side tie rods 48 is connected to a knuckle 49 (see FIG. 3), which is journalled to the corresponding one of the left- and right-side front wheels 3. The rotation of the handlebar 46 is transmitted to the left- and right-side front wheels 3 via the steering shaft 45 and the left- and right-side tie rods 48, thereby steering the left- and right-side front wheels 3. Hereinafter, the axis of the steering shaft 45 will be indicated by C.

At the middle part of the steering shaft 45 in the vertical direction is mounted a steering damper unit 50, through which the steering shaft 45 extends vertically. The steering damper unit 50 is constructed in a structure in which a damper 51 and an input torque selecting mechanism 52, which will be described below, is received in a single-body outer case 53. The steering damper unit 50 is disposed between the cross stay 24 and the cross plate 25. The steering damper unit 50 is fixed to the body frame 2 via stays 13a extending from the respective left- and right-side front pipes 13.

Figure 3:
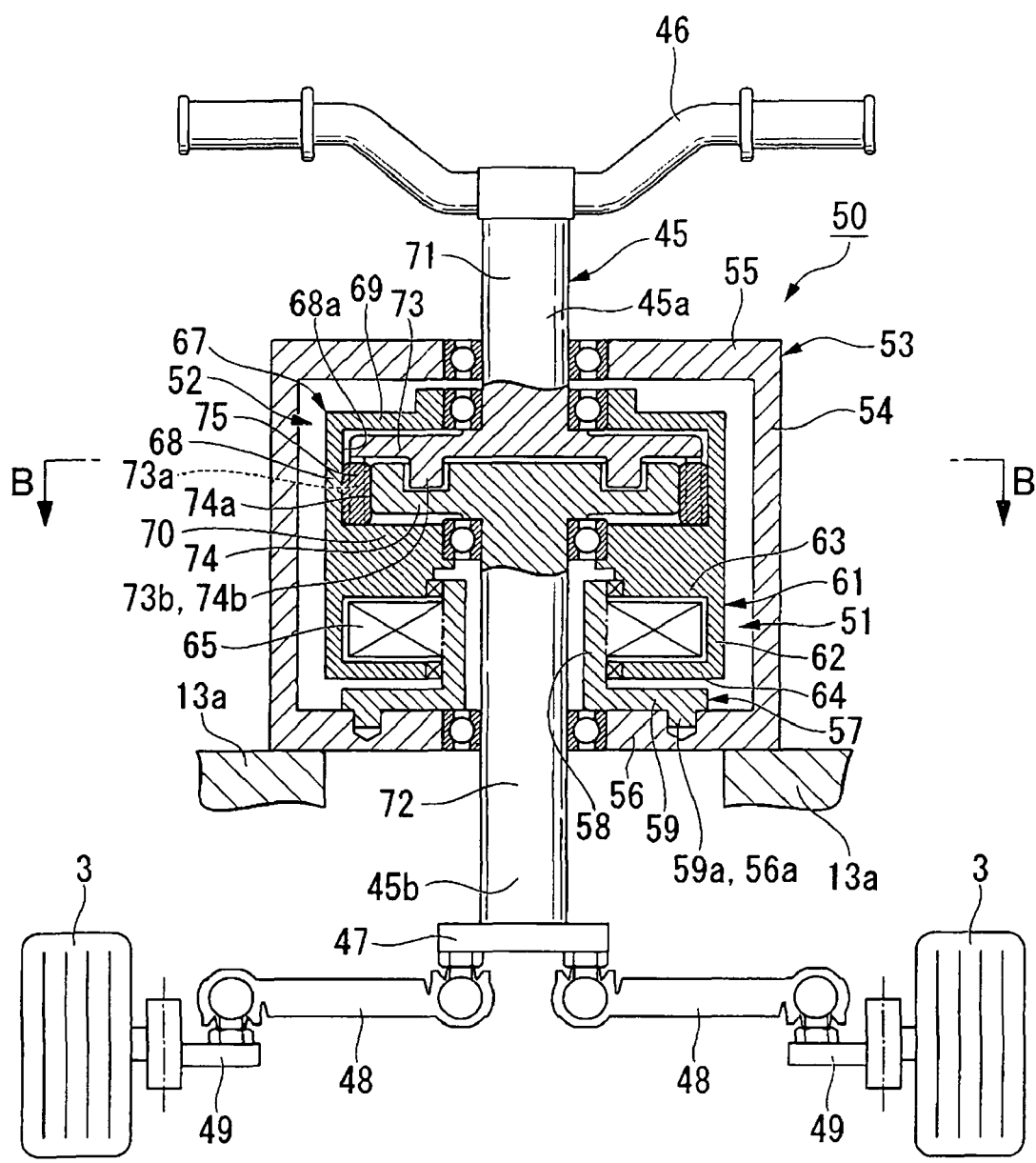
FIG. 3 is an explanatory view showing the construction of a steering damper apparatus with a sectional view of a damper unit.

As shown in FIG. 3, the steering damper unit 50 is constructed in a structure in which the damper 51 is mounted in the lower part of the outer case 53 for damping the rotation of the steering shaft 45 about the axis of the steering shaft 45 (which may be hereinafter simply referred to as the rotation), and the input torque selecting mechanism 52 is disposed in the upper part of the outer case 53.

The outer case 53 is a box-shaped case constructed in a structure in which the top and bottom ends of an outer circumferential wall 54 are blocked by top and bottom walls 55 and 56, respectively. In the middle parts of the top and bottom walls 55 and 56 are formed top and bottom insertion holes, through which the steering shaft 45 is inserted. The outer circumference of the steering shaft 45 is rotatably supported by the inner circumferences of the respective insertion holes. The outer case 53 is supported by the left- and right-side front pipes 13 via the stays 13a.

The damper 51 is a small-sized and lightweight rotary type member. The damper 51 has an inner damper member 57 and an outer damper member 61, which are disposed coaxially with the steering shaft 45.

The inner damper member 57 has a cylindrical collar part 58, through which the steering shaft 45 is inserted, and a flange part 59 formed at the lower end of the collar part 58. The lower surface of the flange part 59 abuts on the upper surface of the bottom wall 56 of the outer case 53, and an engaging part 59a protruding downward from the lower surface of the flange part 59 is engaged in an engaging groove 56a formed at the upper surface of the bottom wall 56 in a depressed shape, whereby the inner damper member 57 is engaged with the outer case 53 in such a manner that the inner damper member 57 cannot be rotated relative to the outer case 53.

The outer damper member 61 is an annular member surrounding the outer circumference of the collar part 58. The outer damper member 61 has an outer circumferential wall 62 and top and bottom walls 63 and 64 extending from the upper and lower ends of the outer circumferential wall 62 to the inner circumferential side. The outer damper member 61 is formed with an approximately U-shaped section opened to the inner circumferential side in the section perpendicular to the circumferential direction (the rotating direction) of the outer damper member 61. The top wall 63 of the outer damper member 61 is integrally formed with a bottom wall 70 of a housing 67 in the input torque selecting mechanism 52. The outer damper member 61 is rotatably supported by the steering shaft 45 together with the housing 67.

The inner circumferences of the top and bottom walls 63 and 64 of the outer damper member 61 abut on the outer circumference of the collar part 58 of the inner damper member 57 in an oiltight state and in such a manner that the outer damper member 61 can be rotated relative to the inner damper member 57, whereby the outer damper member 61 forms an annular oil chamber together with the inner damper member 57. In the oil chamber are disposed, for example, a plurality of stationary disks 65, which are stacked one on another along the axis. In addition, the oil chamber is filled with a viscous fluid, such as silicon oil. The respective disks 65 are attached to the outer circumference of the collar part 58 of the inner damper member 57 such that the respective disks 65 cannot be rotated relative to the collar part 58 of the inner damper member 57. When the outer damper member 61 (the housing 67) is rotated relative to the collar part 58 (the outer case 53), resistance is generated from the respective disk 65 due to the viscous friction between the respective disks 65 and the viscous fluid, thereby absorbing the energy of the relative rotation. In other words, a damping force is applied to the relative rotation torque of the housing 67 to the outer case 53.

The input torque selecting mechanism 52 is constructed in a structure in which an input shaft 71 protrudes from the upper part of the housing 67, which constitutes a portion of a clutch mechanism thereof, and an output shaft 72 protrudes from the lower part of the housing 67.

The respective shafts 71 and 72 are disposed coaxially with the steering shaft 45. The respective shafts 71 and 72 are arranged such that one end of the shaft 71 faces one end of the shaft 72 in the housing 67. The steering shaft 45 is divided into upper and lower parts in the outer case 53. An upper shaft 45a, which constitutes the upper part of the steering shaft 45, constitutes the input shaft 71, and a lower shaft 45b, which constitutes the lower part of the steering shaft 45, constitutes the output shaft 72. Alternatively, the respective shafts 71 and 72 may be constructed separately from the upper and lower shafts 45a and 45b constituting the steering shaft 45.

At the lower end of the input shaft 71 and the upper end of the output shaft 72 are integrally formed input-side and output-side plate parts 73 and 74, respectively, which are formed in the shape of a disk, and are disposed coaxially with the input shaft 71 and the output shaft 72.

Figure 4A:
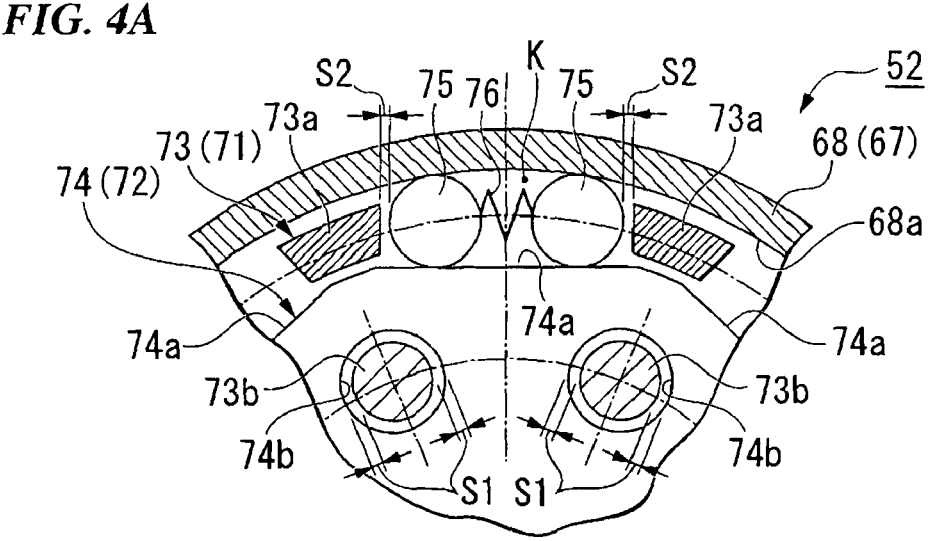
Figure 4B:
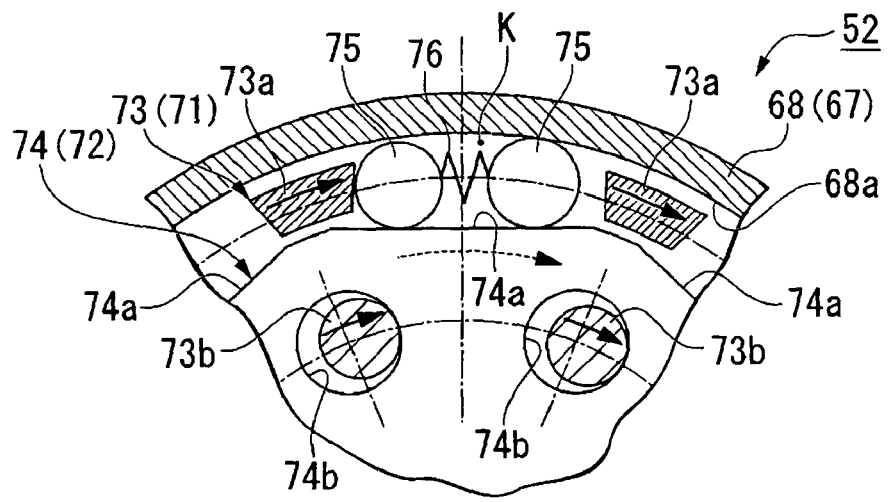
Figure 4C:
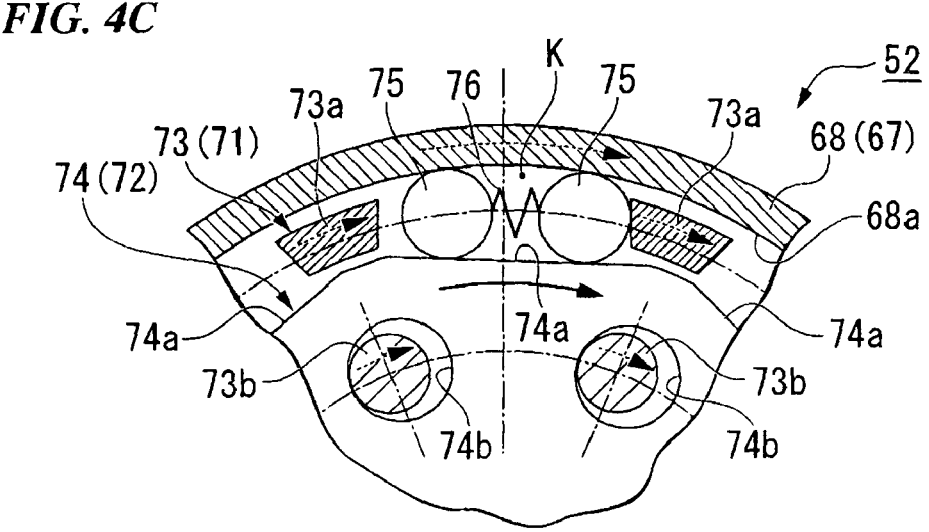

Reference is also made to FIGS. 4A to 4C, the input-side plate part 73 is constructed in a structure in which a plurality of ribs 73a protrude from the outer circumferential part of the disk-shaped plate body to the output shaft 72 side, and a plurality of protrusions 73b protrude from the middle part of the plate body in the diametrical direction to the output shaft 72 side. The respective ribs 73a and the protrusions 73b are arranged at regular intervals in the circumferential direction of the plate body.

On the other hand, the output-side plate part 74 has a plate body less in diameter and greater in thickness than the plate body of the input-side plate part 73. The output-side plate part 74 is constructed in the shape of a polygon when viewed in the direction indicated by arrows along the axis (in the axial direction). The output-side plate part 74 has a plurality of flat cam surfaces 74a formed at the outer circumferential surface thereof in such a manner that the flat cam surfaces 74a are arranged at regular intervals in the circumferential direction. The output-side plate part 74 is provided at the middle part thereof in the diametrical direction with a plurality of depressions 74b corresponding to the respective protrusions 73b of the input-side plate part 73. The respective protrusions 73b are engaged in the corresponding depressions 74b. While the protrusions 73b are engaged in the middle parts of the respective depressions 74b (see FIG. 4A), a space S1 is formed between the inner circumferences of the depressions 74b and the outer circumferences of the protrusions 73b in the rotating direction of the respective shafts 71 and 72.

The housing 67 is an annular member surrounding the outer circumferences of the one-end sides of the respective shafts 71 and 72. The housing 67 has an outer circumferential wall 68 and top and bottom walls 69 and 70 extending from the upper and lower ends of the outer circumferential wall 68 to the inner circumferential side. The housing 67 is formed with an approximately U-shaped section opened to the inner circumferential side in the section perpendicular to the circumferential direction of the housing 67. The bottom wall 70 of the housing 67 is integrally formed with the outer damper member 61, as previously described. The housing 67 is rotatably supported by the outer circumferences of the respective shafts 71 and 72 at the inner circumferences of the top and bottom walls 69 and 70 of the housing 67 while the respective plate parts 73 and 74 are received in the housing 67.

The outer circumferential wall 68 of the housing 67 has a cylindrical inner circumferential surface 68a, which is circular when viewed in the axial direction. The outer circumferential surface (the cam surfaces 74a) of the output-side plate part 74 is disposed inside the inner circumferential surface 68a of the housing 67 such that the outer circumferential surface of the output-side plate part 74 is spaced a predetermined distance from the inner circumferential surface 68a of the housing 67. The respective ribs 73a of the input-side plate part 73 are disposed with tolerance in the space.

While the respective plate parts 73 and 74 are opposite to each other, and the protrusions 73b are received in the respective depressions 74b, the respective cam surfaces 74a are positioned between the neighboring ribs 73a in the space. Pairs of rollers 75, serving as engaging members of the respective shafts 71 and 72, are received in a space defined between the neighboring ribs 73a (hereinafter, referred to as an engagement space K) disposed between the respective cam surfaces 74a and the inner circumferential surface 68a.

As shown in FIG. 4A, the respective rollers 75 are cylindrical members extending along the axis. A compression coil spring 76 is disposed between each roller pair in the engagement space K between the ribs 73a in a compressed state. By the spring force of the coil spring 76, both the rollers 75 are biased to opposite sides in the circumferential direction in the engagement space K. Since each engagement space K is formed such that the diametrical widths of the opposite sides in the circumferential direction is less than the diametrical width of the middle part in the circumferential direction, and the rollers 75 are biased as described above, both the rollers 75 serve as wedges fitted in the space between the corresponding cam surface 74a of the output-side plate part 74 and the inner circumferential surface 68a of the housing 67, whereby the output-side plate part 74 (the output shaft 72) and the housing 67 are engaged with each other in such a manner that the output-side plate part 74 and the housing 67 cannot be rotated relative to each other.

While the protrusions 73b are positioned in the middle parts of the respective depressions 74b, a space S2 is formed, in the rotating direction of the respective shafts, between both the rollers 75 located in such a manner that the rollers 75 are wedged between the respective plate parts 73 and 74 and the ribs 73a positioned at the opposite sides of the rollers 75 in the circumferential direction. Here, the space S2 is smaller than the space S1.

The steering damper apparatus according to this embodiment has the above-described construction. Hereinafter, the operation of the steering damper apparatus will be described.

First, as shown in FIG. 4A, in a state in which no torque is inputted to any one of the upper and lower shafts 45a and 45b (the respective shafts 71 and 72) of the steering shaft 45 (a state in which no relative rotation torque is applied to the respective shafts 71 and 72, which will be hereinafter referred to as a neutral position), a pair of rollers 75 in each engagement space K are biased such that the rollers 75 are spaced apart from each other by the compression coil spring 76, and the rollers 75 are wedged between the cam surface 74a of the output-side plate part 74 and the inner circumferential surface 68a of the housing 67. At this time, the space S2 is formed between the respective ribs 73a and the neighboring rollers 75 in the rotating direction, and the space S1 is formed between the inner circumferences of the respective depressions 74b and the outer circumferences of the corresponding protrusions 73b in the rotating direction.

Next, when a torque is inputted to the input shaft 71, for example, in a clockwise direction on the drawing, and therefore, the input-side plate part 73 is rotated relative to the output-side plate part 74 from the above-mentioned neutral state, as shown in FIG. 4B, the rib 73a adjacent to the downstream side in the rotating direction abuts on the roller 75 located at the downstream side in the rotating direction in each engagement space K with the space S2 not being formed therebetween. At this time, the roller 75 located at the downstream side in the rotating direction is pushed to the upstream side in the rotating direction against the biasing force of the coil spring 76. As a result, the wedge-type engagement between the output-side plate part 74 and the housing 67 is released.

At the time when the rib 73a abuts on the corresponding roller 75, on the other hand, the inner circumferences of the depressions 74b and the outer circumferences of the protrusions 73b do not still abut on each other. When the input-side plate part 73 performs a relative rotation from this state, the inner circumferences of the depressions 74b and the outer circumferences of the protrusions 73b abut on each other with the space S1 not being formed therebetween. As a result, the respective plate parts 73 and 74 are engaged with each other in such a manner that the respective plate parts 73 and 74 cannot be rotated relative to each other.

In addition, the roller 75 located at the upstream side in the rotating direction in each engagement space K is moved in the direction in which the diametrical width of the engagement space K between the cam surface 74a and the inner circumferential surface 68a of the housing 67 is increased, whereby the wedge-type engagement between the output-side plate part 74 and the housing 67 is released. As a result, the torque from the input-side plate part 73 is not transmitted to the housing 67, and therefore, the relative rotation between the input-side plate part 73 and the housing 67 is allowed.

That is to say, when the torque is inputted to the input shaft 71, the respective shafts 71 and 72 are rotated together relative to the housing 67, while the housing 67 is stopped. Consequently, the damper 51 does not apply a damping force to the torque inputted to the input shaft 71, thereby keeping the steering of the handlebar light and smooth. Also, even when a torque is inputted to the input shaft 71 in a counterclockwise direction on the drawing, the input torque is not damped in the same manner as above. That is to say, the torque is transmitted from the input shaft 71 to the output shaft 72 in a non-damped state irrespective of the rotating directions of the input shaft 71.

On the other hand, when a torque is inputted to the output shaft 72, for example, in the clockwise direction, and therefore, the output-side plate part 74 is rotated relative to the input-side plate part 73 from the neutral state, as shown in FIG. 4C, the roller 75 located at the downstream side in the rotating direction in each engagement space K maintains the wedge-type engagement between the output-side plate part 74 and the housing 67, and the output-side plate part 74 is rotated relative to the input-side plate part 73. At this time, the rib 73a located at the downstream side in the rotating direction is not adjacent to the roller 75 located at the downstream side in the rotating direction (the rib 73a is separated from the corresponding roller 75). As a result, the wedge-type engagement is not released by the rib 73a. Consequently, the relative rotation between the output-side plate part 74 and the housing 67 via the roller 75 is not allowed, and therefore, the torque is transmitted from the output-side plate part 74 to the housing 67. Also, the rib 73a abuts on the roller 75 located at the upstream side in the rotating direction in each engagement space K; however, the roller 75 is not in the wedge-type engagement when the output-side plate part 74 is rotated.

When the input-side plate part 73 performs a relative movement from the above-described state, the inner circumferences of the depressions 74b and the outer circumferences of the protrusions 73b abut on each other with the space S1 not being formed therebetween. As a result, the respective plate parts 73 and 74 are engaged with each other in such a manner that the respective plate parts 73 and 74 cannot be rotated relative to each other.

That is to say, when the torque is inputted to the output shaft 72, the respective shafts 71 and 72 and the housing 67 are rotated together. Consequently, the damper 51 applies a damping force to the torque inputted to the output shaft 72, and therefore, the rotation of the steering system caused due to the irregularity of a road surface is restrained. Also, even when a torque is inputted to the output shaft 72 in a counterclockwise direction on the drawing, the input torque is damped in the same manner as above. That is to say, the torque is transmitted from the output shaft 72 to the input shaft 71 in a damped state irrespective of the rotating directions of the output shaft 72.

As described above, the steering damper apparatus according to this embodiment includes the body frame 2, the left- and right-side front wheels 3 suspended by the body frame 2, the steering shaft 45 rotatably supported by the body frame 2, one end of the steering shaft 45 being connected to the front wheel 3 side, the handlebar 46 connected to the other end of the steering shaft 45 for rotating the steering shaft 45 to steer the left- and right-side front wheels 3, and the damper 51 for damping the rotation of the steering shaft 45. Consequently, the rotation of the steering shaft 45 is damped by the damper 51 only when a torque from a road surface is inputted.

More specifically, the steering damper apparatus includes the input torque selecting mechanism 52, which has the input shaft 71, the output shaft 72, and the housing 67 for rotatably supporting the respective shafts 71 and 72, and constructed such that, when a torque is inputted from the input shaft 71, the input shaft 71 rotates the output shaft 72 relative to the housing 67, and, on the other hand, when a torque is inputted from the output shaft 72, the output shaft 72 rotates the input shaft 71 and the housing 67. The input shaft 71 is connected to the handlebar 46 side, and the output shaft 72 is connected to the front wheel 3 side. The housing 67 is connected to the damper 51. The respective shafts 71 and 72 are rotated to steer the left- and right-side front wheels 3. Consequently, when the housing 67 is rotated, the rotation of the housing 67 is damped by the damper 51.

According to the above-described construction, when the handlebar 46 or any one of the left- and right-side front wheels 3 is selected as the output shaft 72 side, it is possible to generate a damping force of the damper 51 only when there is an input from the output shaft 72. Consequently, it is possible to meet various steering characteristics desired by a rider, for example, when no damping force is applied to the manipulation of the handlebar or when information from the road surface is directly transmitted to the handlebar 46 and, in addition, the rider wishes to obtain a sensation of the handlebar manipulation.

In addition, in the steering damper apparatus, a part of the steering shaft 45 is constituted by the input shaft 71 and the output shaft 72 of the input torque selecting mechanism 52. Consequently, it is possible to advantageously use the input shaft 71 and the output shaft 72 of the input torque selecting mechanism 52 as the steering shaft 45. Also, it is possible to reduce the number of components of the steering system.

Furthermore, in the steering damper apparatus, the input shaft 71 of the input torque selecting mechanism 52 is connected to the handlebar 46 side, and therefore, the input from the handlebar 46 is transmitted to the front wheel 3 side without the generation of a damping force, whereby it is possible to keep the steering of the handlebar 46 light and smooth. On the other hand, the input from the road surface is transmitted to the handlebar 46 side with the generation of a damping force, and therefore, it is possible to effectively restrain the rotation of the steering system caused due to the irregularity of the road surface.

Embodiment 2

Hereinafter, a second embodiment of the present invention will be described.

Figure 5:
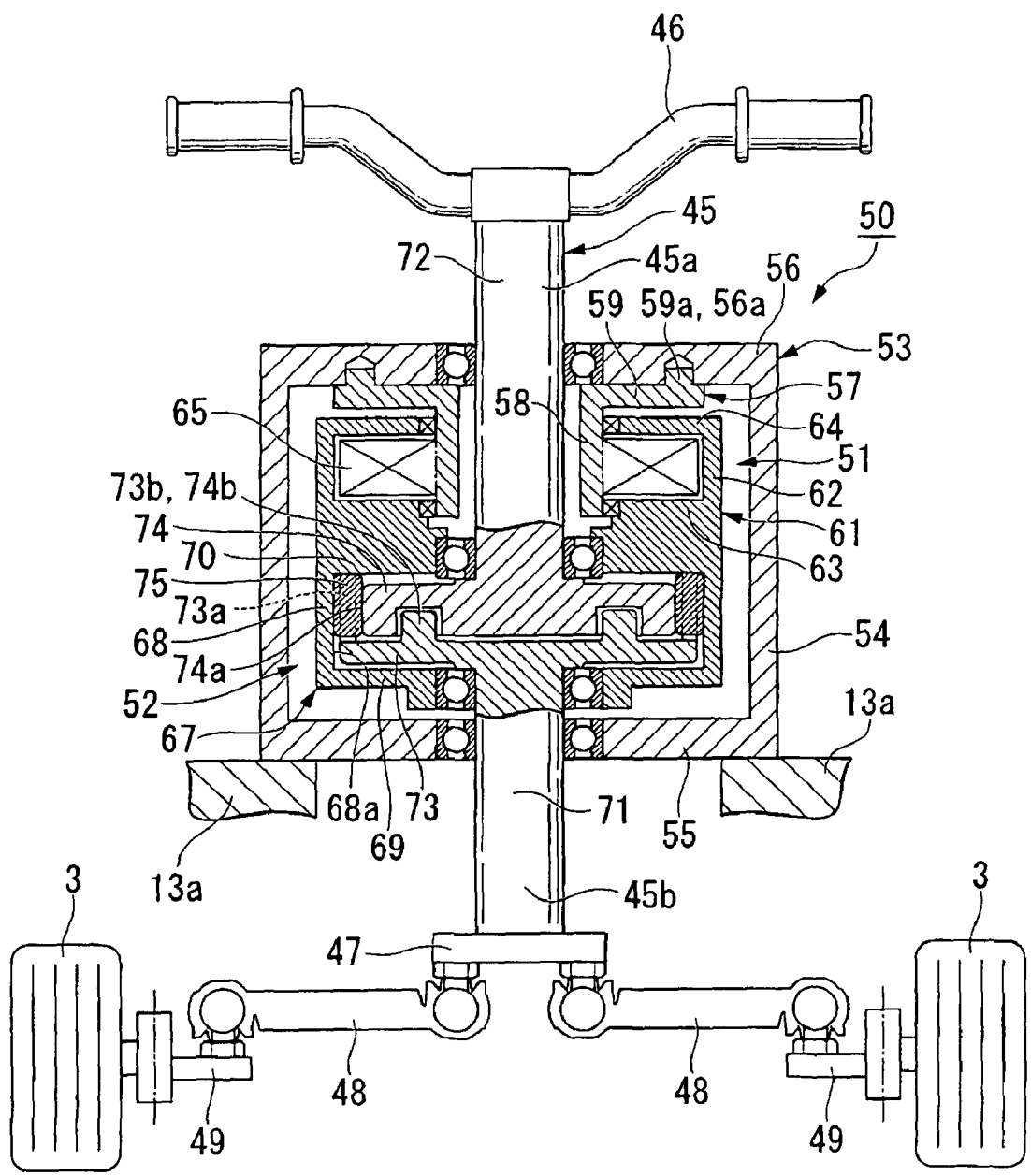
FIG. 5 is an explanatory view corresponding to FIG. 3, showing a second embodiment of the present invention.

As shown in FIG. 5, a steering device according to this embodiment is principally different from the one according to the first embodiment in that the steering damper unit 50 is mounted upside down, and the input shaft 71 of the input torque selecting mechanism 52 is connected to the front wheel side while the output shaft 72 of the input torque selecting mechanism 52 is connected to the handlebar 46.

Consequently, parts of this embodiment identical to those of the previous embodiment are denoted by the same reference symbols, and the description thereof will not be given.

The steering damper unit 50 according to this embodiment is constructed in a structure in which the damper 51 is disposed in the upper part of the outer case 53, and the input torque selecting mechanism 52 is disposed in the lower part of the outer case 53.

The input torque selecting mechanism 52 is constructed in a structure in which the output shaft 72 protrudes from the upper part of the housing 67, and the input shaft 71 protrudes from the lower part of the housing 67. The output shaft 72 constitutes the upper shaft 45a of the steering shaft 45, and the input shaft 71 constitutes the lower shaft 45b of the steering shaft 45. The input- and output-side plate parts 73 and 74 are integrally formed at the neighboring ends of the respective shafts 71 and 72, respectively.

The damper 51 has the inner damper member 57 and the outer damper member 61, which are disposed coaxially with the steering shaft 45. The engaging part 59a is engaged in the engaging groove 56a of the outer case 53, whereby the inner damper member 57 is engaged with the outer case 53 in such a manner that the inner damper member 57 cannot be rotated relative to the outer case 53. When the outer damper member 61 is rotated relative to the inner damper member 57, the energy of the relative rotation is absorbed by the viscous friction in the outer damper member 61 (a damping force is applied to the relative rotation torque of the outer damper member 61 to the inner damper member 57).

The steering damper apparatus according to this embodiment has the above-described construction. Hereinafter, the operation of the steering damper apparatus will be described.

First, a pair of rollers 75 in each engagement space K are engaged with the cam surface 74a of the output-side plate part 74 and the inner circumferential surface 68a of the housing 67 in a wedge fashion at the neutral position (see FIG. 4A). When a torque rotating about the axis is inputted to the input shaft 71 from this state, the wedge-type engagement of the respective rollers 75 is released, and the torque is transmitted from the input-side plate part 73 to the output-side plate part 74 (see FIG. 4B).

That is to say, when the torque is inputted to the input shaft 71, the respective shafts 71 and 72 are rotated together, while the housing 67 is stopped. Consequently, the damper 51 does not apply a damping force to the torque inputted to the input shaft 71 of the wheel side, and therefore, the input from the road surface is directly transmitted to the handlebar 46 side.

On the other hand, when a torque rotating about the axis is inputted to the output shaft 72 from the neutral state, the roller 75 located at the downstream side in the rotating direction in each engagement space K maintains the wedge-type engagement between the output-side plate part 74 and the housing 67, and the torque is transmitted from the output-side plate part 74 to the input-side plate part 73 (see FIG. 4C).

That is to say, when the torque is inputted to the output shaft 72, the respective shafts 71 and 72 and the housing 67 are rotated together. Consequently, the damper 51 applies a damping force to the torque inputted to the output shaft 72, and therefore, a good sensation of the handlebar manipulation is provided.

As described above, it is possible for the steering damper apparatus according to this embodiment to generate a damping force of the damper 51 only when there is an input from the handlebar 46 and to meet various steering characteristics desired by a rider, in the same manner as the first embodiment.

In addition, the steering damper apparatus, the input shaft 71 of the input torque selecting mechanism 152 is connected to the front wheel 3 side. Consequently, the input from the road surface is directly transmitted to the handlebar 46 side without the generation of a damping force, and therefore, it is possible to accurately transmit the information from the road surface to the rider. On the other hand, the input from the handlebar 46 is transmitted to the front wheel 3 side with the generation of a damping force, and therefore, it is possible to provide a good sensation of the handlebar manipulation.

Embodiment 3

Hereinafter, a third embodiment of the present invention will be described.

Figure 6:
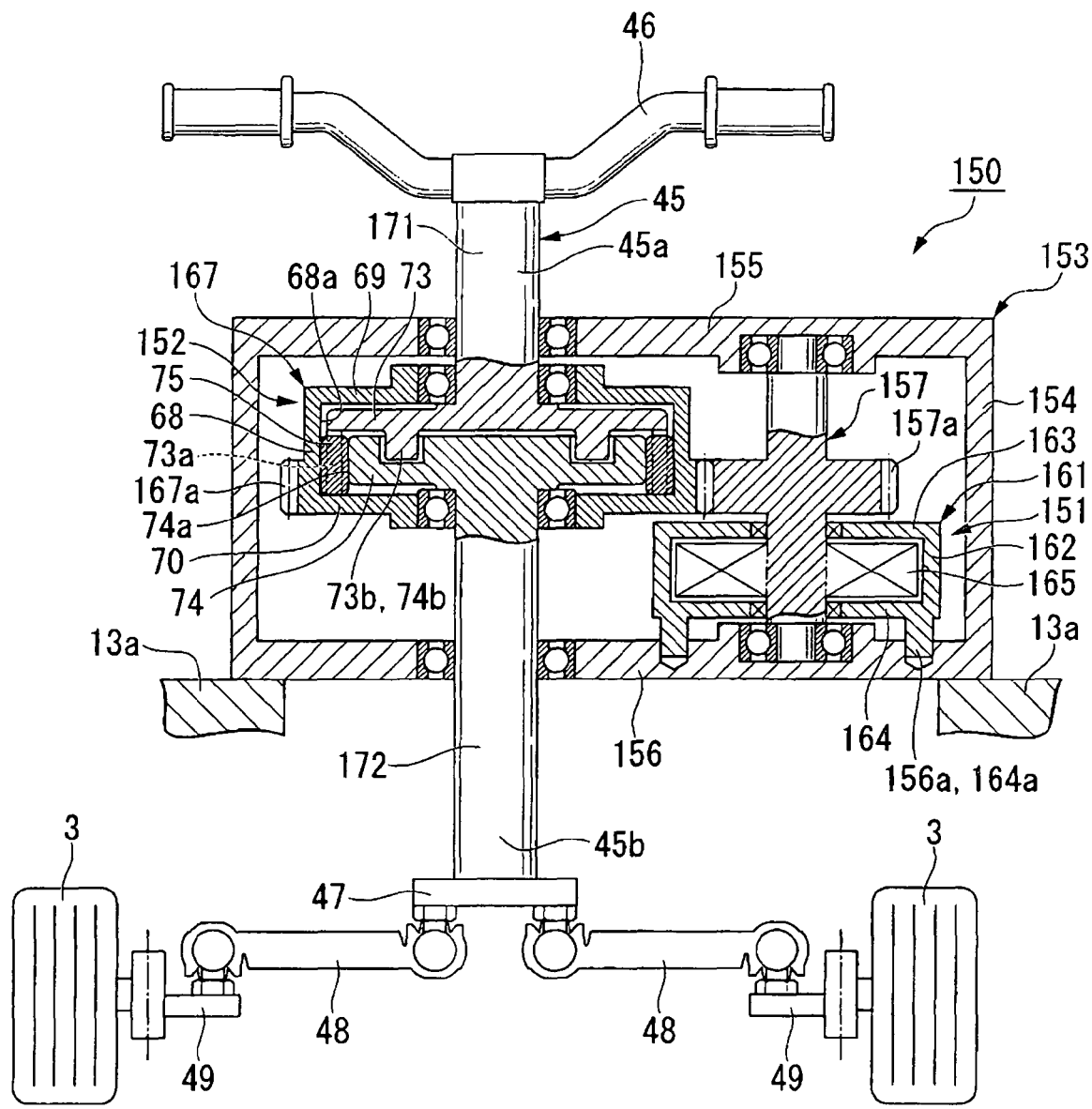
FIG. 6 is an explanatory view corresponding to FIG. 3, showing a third embodiment of the present invention.

As shown in FIG. 6, a steering damper apparatus according to this embodiment is principally different from the ones according to the first and second embodiments in that a damper 151 and an input torque selecting mechanism 152 disposed in a non-coaxial manner, respectively, and the damper 151 and a housing 167 of the input torque selecting mechanism 152 are connected with each other via gears 157a and 167a. Consequently, parts of this embodiment identical to those of the previous embodiments are denoted by the same reference symbols, and the description thereof will not be given.

A steering damper unit 150 according to this embodiment is constructed in a structure in which the input torque selecting mechanism 152 is disposed in a space located coaxially with the steering shaft 45 in an outer case 153, and the damper 151 is disposed in a space offset from the steering shaft 45 in the outer case 153.

The outer case 153 is a box-shaped case constructed in a structure in which the top and bottom ends of an outer circumferential wall 154 are blocked by top and bottom walls 155 and 156, respectively. In the top and bottom walls 155 and 156 are formed top and bottom insertion holes, through which the steering shaft 45 is inserted. The outer circumference of the steering shaft 45 is rotatably supported by the inner circumferences of the respective insertion holes. The outer case 153 is supported by the left- and right-side front pipes 13 via the stays 13a.

The input torque selecting mechanism 152 is constructed in a structure in which an input shaft 171 protrudes from the upper part of the housing 167, and an output shaft 172 protrudes from the lower part of the housing 167.

The respective shafts 171 and 172 are disposed coaxially with the steering shaft 45. The respective shafts 171 and 172 are arranged such that one end of the shaft 171 faces one end of the shaft 172 in the housing 167. The input shaft 171 constitutes the upper shaft 45a of the steering shaft 45, and the output shaft 172 constitutes the lower shaft 45b of the steering shaft 45. Alternatively, the respective shafts 171 and 172 may be constructed separately from the upper and lower shafts 45a and 45b.

At the one end of the input shaft 171 and the one end of the output shaft 172 are integrally formed the input-side and output-side plate parts 73 and 74, respectively, which are formed in the shape of a disk, and are disposed coaxially with the respective shafts 171 and 172. As compared with the housing 67, the housing 167 is constructed in a structure in which the outer damper member 61 is separated from the housing 167, in which the respective plate parts 73 and 74 are received, and the drive gear 167a is integrally formed at the outer circumference of the upper part of the outer circumferential wall 68. The outer circumferences of the respective shafts 171 and 172 are rotatably supported by the inner circumferences of the top and bottom walls 69 and 70 extending from the upper and lower ends of the outer circumferential wall 68 to the inner circumferential side. A clutch mechanism, which is constituted by the housing 167 and components mounted in the housing 167, is disposed in the upper part of the outer case 153.

The damper 151 has a supporting shaft 157 offset from the steering shaft 45 and an outer damper member 161, which is disposed coaxially with the supporting shaft 157.

The supporting shaft 157 extends from the top wall 155 to the bottom wall 156 of the outer case 153. The upper and lower ends of the supporting shaft 157 are rotatably supported by the upper and lower walls 155 and 156. The driven gear 157a, which is engaged with the drive gear 167a, is integrally formed at the middle part of the supporting shaft 157 in the vertical direction.

The outer damper member 161 is an annular member surrounding the outer circumference of the supporting shaft 157 below the driven gear 157a. The outer damper member 161 has an outer circumferential wall 162 and top and bottom walls 163 and 164 extending from the upper and lower ends of the outer circumferential wall 162 to the inner circumferential side. The outer damper member 161 is formed with an approximately U-shaped section opened to the inner circumferential side in the section perpendicular to the circumferential direction (the rotating direction) of the outer damper member 161. At the lower surface of the bottom wall 164 of the outer damper member 161 is mounted an engaging part 164a, which protrudes downward. The engaging part 164a is engaged in an engaging groove 156a formed at the upper surface of the bottom wall 156 of the outer case 153 in a depressed shape, whereby the outer damper member 161 is engaged with the outer case 153 in such a manner that the outer damper member 161 cannot be rotated about the supporting shaft 157 relative to the outer case 153.

The inner circumferences of the top and bottom walls 163 and 164 of the outer damper member 161 abut on the outer circumference of the supporting shaft 157 in an oiltight state and in such a manner that the outer damper member 161 can be rotated relative to the supporting shaft 157, whereby the outer damper member 161 forms an annular oil chamber together with the supporting shaft 157. In the oil chamber are disposed, for example, a plurality of stationary disks 165, which are stacked one on another along the axis. In addition, the oil chamber is filled with a viscous fluid, such as silicon oil. The respective disks 165 are attached to the outer circumference of the supporting shaft 157 such that the respective disks 165 cannot be rotated relative to the supporting shaft 157. When the supporting shaft 157 is rotated relative to the outer damper member 161, resistance is generated from the respective disk 165 due to the viscous friction between the respective disks 165 and the viscous fluid, thereby absorbing the energy of the relative rotation (a damping force is applied to the relative rotation torque of the supporting shaft 157 to the outer damper member 161).

A damper mechanism, which is constituted by the outer damper member 161 and components mounted in the outer damper member 161, is disposed in the lower part of the outer case 153. One side of the damper mechanism overlaps with one side of the housing 167 of the input torque selecting mechanism 152 in the vertical direction (rough when viewed in the axial direction), and therefore, the receiving space in the outer case 153 is efficiently used. In addition, the damper 151 is disposed while being offset from the input torque selecting mechanism 152, and therefore, the vertical width of the outer case 153 (the steering damper unit 150) is reduced as compared with the case that the damper 151 and the input torque selecting mechanism 152 are disposed coaxially with each other while the damper 151 and the input torque selecting mechanism 152 overlap with each other (see the first and second embodiments).

Figure 7A:
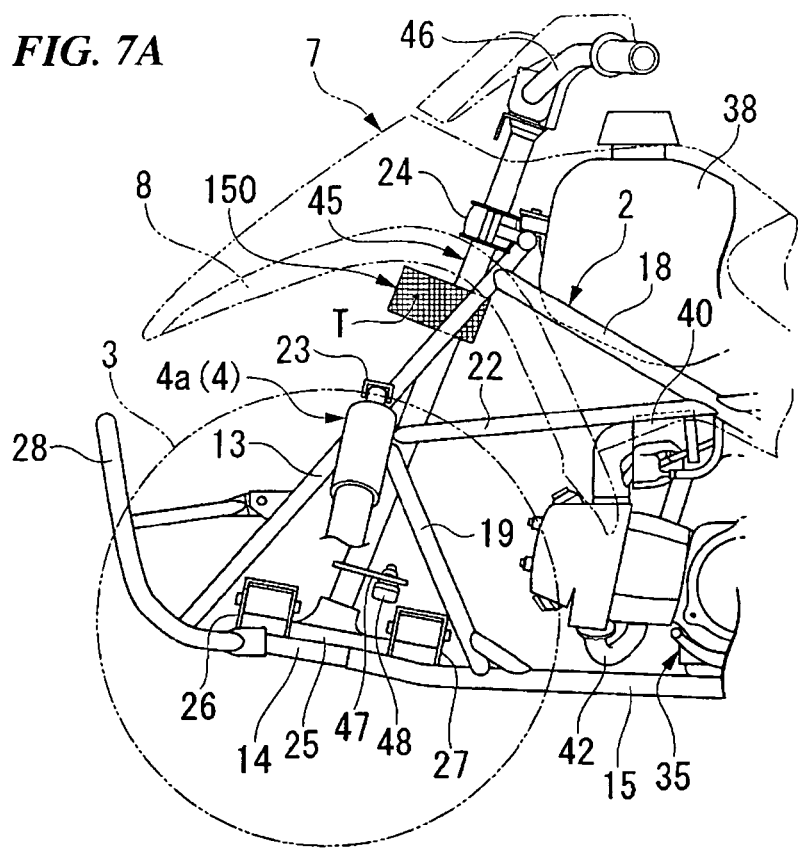
FIGS. 7A and 7B are side views showing arrangement examples of a damper unit according to the third and a fourth embodiments of the present invention.
Figure 7B:
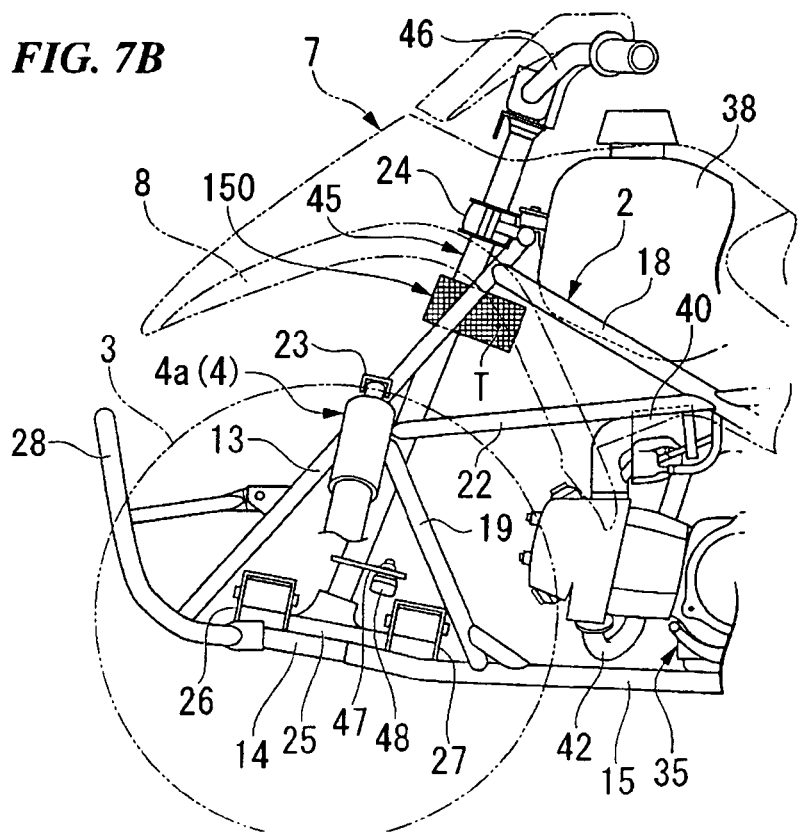

Moreover, the steering damper unit 150 is constructed in a structure in which the damper 151 is offset from the input torque selecting mechanism 152, and therefore, the part for receiving the damper 151 protrudes when viewed in the axial direction. When the protruding part T is disposed such that the protruding part T is located in front of the steering shaft 45, as shown in FIG. 7A, the cooling effect of the damper 151 by traveling wind is improved. On the other hand, even when the protruding part T is disposed such that the protruding part T is located at the rear of the steering shaft 45, as shown in FIG. 7B, the protruding part T is adjacent to an engine cooling line or a radiator line, and therefore, the protruding part T is effectively cooled. In addition, the protruding part T is located further adjacent to the inside of the body frame 2, and therefore, the protruding part T is more effectively protected from flying stones.

The steering damper apparatus according to this embodiment has the above-described construction. Hereinafter, the operation of the steering damper apparatus will be described.

First, a pair of rollers 75 in each engagement space K are engaged with the cam surface 74a of the output-side plate part 74 and the inner circumferential surface 68a of the housing 167 in a wedge fashion at the neutral position (see FIG. 4A). When a torque rotating about the axis is inputted to the input shaft 171 from this state, the wedge-type engagement of the respective rollers 75 is released, and the torque is transmitted from the input-side plate part 73 to the output-side plate part 74 (see FIG. 4B).

That is to say, when the torque is inputted to the input shaft 171, the respective shafts 171 and 172 are rotated together, while the housing 167 is stopped, and therefore, the supporting shaft 157 of the damper 151, which is engaged with the housing 167, is also stopped. Consequently, the damper 151 does not apply a damping force to the torque inputted to the input shaft 171, thereby keeping the steering of the handlebar light and smooth.

On the other hand, when a torque rotating about the axis is inputted to the output shaft 172 from the neutral state, the roller 75 located at the downstream side in the rotating direction in each engagement space K maintains the wedge-type engagement between the output-side plate part 74 and the housing 167, and the torque is transmitted from the output-side plate part 74 to the input-side plate part 73 (see FIG. 4C).

That is to say, when the torque is inputted to the output shaft 172, the respective shafts 171 and 172 and the housing 167 are rotated together. At this time, the housing 167 and the supporting shaft 157 are engaged with each other via the respective gears 157a and 167a, and therefore, when the torque is inputted to the output shaft 172, the supporting shaft 157 is also rotated together with the respective shafts 171 and 172 and the housing 167. Consequently, the damper 151 applies a damping force to the torque inputted to the output shaft 172, and therefore, the rotation of the steering system caused due to the irregularity of a road surface is restrained.

As described above, it is possible for the steering damper apparatus according to this embodiment to generate a damping force of the damper 151 only when there is an input from the front wheels 3 and to meet various steering characteristics desired by a rider. Moreover, it is possible to keep the steering of the handlebar light and smooth without the generation of a damping force for the input from the handlebar 46. On the other hand, a damping force is generated for the input from the road surface, and therefore, it is possible to restrain the rotation of the steering system caused due to the irregularity of the road surface.

In addition, in the steering damper apparatus according to this embodiment, the damper 151 and the housing 167 of the input torque selecting mechanism 152 are offset from each other, and the damper 151 and the housing 167 are connected with each other via the gears 157a and 167a. Consequently, it is possible to relatively freely dispose the damper 151 at the circumference of the input torque selecting mechanism 152, and it is possible to easily change the damping characteristics through the change of a gear ratio.

Embodiment 4

Hereinafter, a fourth embodiment of the present invention will be described.

Figure 8:
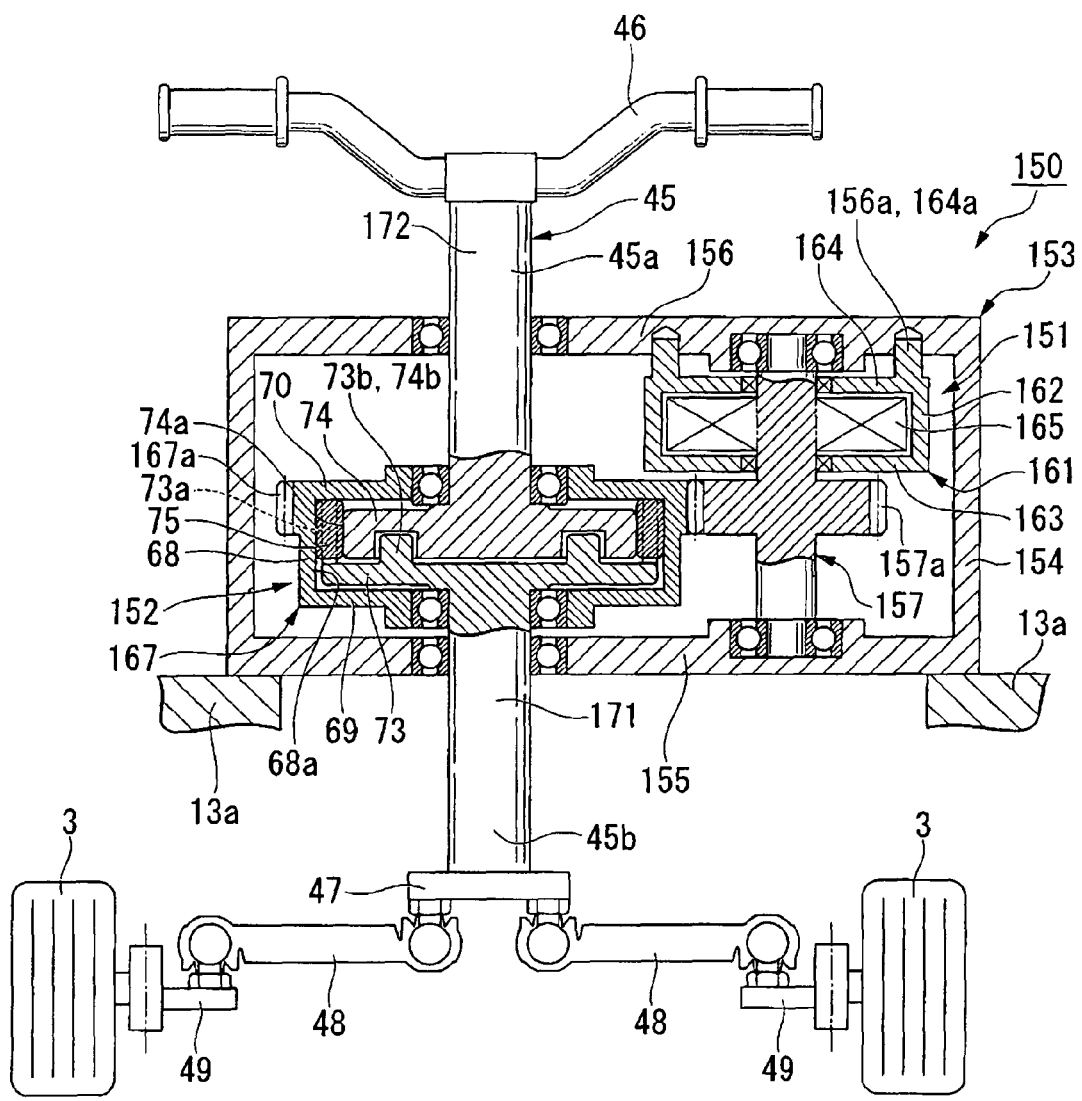
FIG. 8 is an explanatory view corresponding to FIG. 3, showing the fourth embodiment of the present invention.

As shown in FIG. 8, a steering damper unit 150 according to this embodiment is principally different from the one according to the third embodiment in that the steering damper unit 150 is mounted upside down, and the input shaft 171 of the input torque selecting mechanism 152 is connected to the front wheel side while the output shaft of the input torque selecting mechanism 152 is connected to the handlebar 46. Consequently, parts of this embodiment identical to those of the previous embodiments are denoted by the same reference symbols, and the description thereof will not be given.

The steering damper unit 150 according to this embodiment is constructed in a structure in which the input torque selecting mechanism 152 is disposed in a space located coaxially with the steering shaft 45 in an outer case 153, and the damper 151 is disposed in a space offset from the steering shaft 45 in the outer case 153.

The input torque selecting mechanism 152 is constructed in a structure in which the output shaft 172 protrudes from the upper part of the housing 167, and the input shaft 171 protrudes from the lower part of the housing 167. The output shaft 172 constitutes the upper shaft 45a of the steering shaft 45, and the input shaft 171 constitutes the lower shaft 45b of the steering shaft 45. At one end of the input shaft 171 and one end of the output shaft 172 opposite to the one end of the input shaft 171 are integrally formed the input-side and output-side plate parts 73 and 74, respectively. At the outer circumference of the upper part of the outer circumferential wall 68 of the housing 167, in which the respective plate parts 73 and 75 are received, is integrally formed a drive gear 167a.

The damper 151 has a supporting shaft 157 and an outer damper member 161, which is disposed coaxially with the supporting shaft 157. At the middle part of the supporting shaft 157 in the vertical direction is integrally formed a driven gear 157a, which is engaged with the drive gear 167a. The engaging part 164a is engaged in the engaging groove 156a of the outer case 153, whereby the outer damper member 161 is engaged with the outer case 153 in such a manner that the outer damper member 161 cannot be rotated about the supporting shaft 157 relative to the outer case 153. When the supporting shaft 157 is rotated relative to the outer damper member 161, the energy of the relative rotation is absorbed by the viscous friction in the outer damper member 161 (a damping force is applied to the relative rotation torque of the supporting shaft 157 to the outer damper member 161).

The steering damper apparatus according to this embodiment has the above-described construction. Hereinafter, the operation of the steering damper apparatus will be described.

First, a pair of rollers 75 in each engagement space K are engaged with the cam surface 74a of the output-side plate part 74 and the inner circumferential surface 68a of the housing 167 in a wedge fashion at the neutral position (see FIG. 4A). When a torque rotating about the axis is inputted to the input shaft 171 from this state, the wedge-type engagement of the respective rollers 75 is released, and the torque is transmitted from the input-side plate part 73 to the output-side plate part 74 (see FIG. 4B).

That is to say, when the torque is inputted to the input shaft 171, the respective shafts 171 and 172 are rotated together, while the housing 167 is stopped, and therefore, the supporting shaft 157 of the damper 151, which is engaged with the housing 167, is also stopped. Consequently, the damper 151 does not apply a damping force to the torque inputted to the input shaft 171 of the wheel side, and therefore, the input from the road surface is directly transmitted to the handlebar 46 side.

On the other hand, when a torque rotating about the axis is inputted to the output shaft 172 from the neutral state, the roller 75 located at the downstream side in the rotating direction in each engagement space K maintains the wedge-type engagement between the output-side plate part 74 and the housing 167, and the torque is transmitted from the output-side plate part 74 to the input-side plate part 73 (see FIG. 4C).

That is to say, when the torque is inputted to the output shaft 172, the respective shafts 171 and 172 and the housing 167 are rotated together. At this time, the housing 167 and the supporting shaft 157 are engaged with each other via the respective gears 157a and 167a, and therefore, when the torque is inputted to the output shaft 172, the supporting shaft 157 is also rotated together with the respective shafts 171 and 172 and the housing 167. Consequently, the damper 151 applies a damping force to the torque inputted to the output shaft 172, and therefore, a good sensation of the handlebar manipulation is provided.

As described above, it is possible for the steering damper apparatus according to this embodiment to generate a damping force of the damper 151 only when there is an input from the handlebar 46 and to meet various steering characteristics desired by a rider. In addition, it is possible to accurately transmit the information from the road surface to the rider without the generation of a damping force for the input from the road surface. On the other hand, a damping force is generated for the input from the handlebar 46, and therefore, it is possible to provide a good sensation of the handlebar manipulation. Furthermore, it is possible to relatively freely dispose the damper 151 at the circumference of the input torque selecting mechanism 152, and it is possible to easily change the damping characteristics through the change of the gear ratio.

Embodiment 5

Hereinafter, a fifth embodiment of the present invention will be described.

Figure 9:
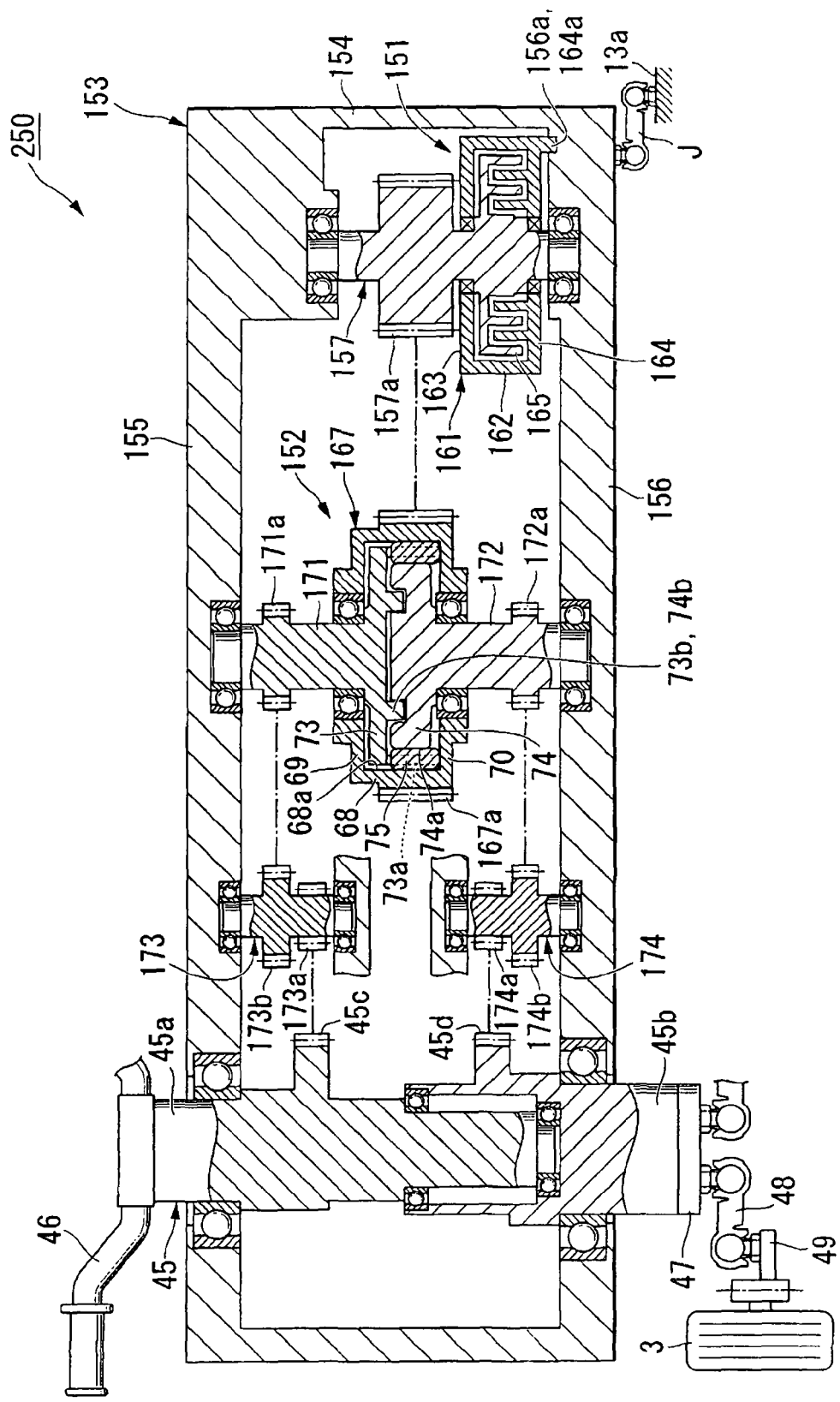
FIG. 9 is an explanatory view corresponding to FIG. 3, showing a fifth embodiment of the present invention.

As shown in FIG. 9, a steering damper apparatus according to this embodiment is principally different from the one according to the third embodiment in that the steering shaft 45 and the input torque selecting mechanism 152 are disposed in a non-coaxial manner, respectively, and the upper end lower shafts 45a and 45b of the steering shaft 45, and input and output shafts 171 and 172 of the input torque selecting mechanism 152 are connected with each other via upper and lower relay gear shafts 173 and 174, respectively. Consequently, parts of this embodiment identical to those of the previous embodiments are denoted by the same reference symbols, and the description thereof will not be given.

A steering damper unit 250 is constructed in a structure in which the upper and lower relay gear shafts 173 and 174 are arranged in spaces offset with respect to the steering shaft 45 in the outer case 153, the input torque selecting mechanism 152 is arranged in a space offset with respect to each of the upper and lower relay gear shafts 173 and 174, and the damper 151 is arranged in a space further offset with respect to the input torque selecting mechanism 152. The outer case 153 is supported on the above-mentioned stays 13*a* via joint arms J having ball joints at both ends.

The upper and lower shafts 45*a* and 45*b* forming the steering shaft 45 are connected coaxially to each other in the outer case 153 so as to freely rotate relative to each other.

On the other hand, the upper and lower relay gear shafts 173 and 174 are arranged in the outer case 153 so as to be parallel to the steering shaft 45. The upper end lower ends of the upper and lower relay gear shafts 173 and 174 are rotatably supported on the outer case 153.

The upper and lower relay gear shafts 173 and 174 are located adjacent to the upper and lower shafts 45*a* and 45*b*, respectively. Upper and lower drive gears 45*c*, 45*d* that are relatively large in diameter are integrally provided to the outer circumferences of the upper and lower shafts 45*a* and 45*b*, respectively. Furthermore, upper and lower steering-side gears 173*a* and 174*a*, which are relatively small in diameter and mesh with the upper and lower drive gears 45*c* and 45*d*, are integrally provided to the outer circumferences of the upper and lower relay gear shafts 173 and 174, respectively.

The upper and lower relay gear shafts 173 and 174 are also located adjacent to the input shaft 171 and the output shaft 172 on the upper and lower sides of the input torque selecting mechanism 152, respectively. Output- and input-side driven gears 171*a* and 172*a* are integrally provided to the outer circumferences of the input and output shafts 171 and 172, respectively. Furthermore, upper and lower mechanism-side gears 173*b* and 174*b* that mesh with the output- and input-side driven gears 171*a* and 172*a* are integrally provided to the outer circumferences of the upper and lower relay gear shafts 173 and 174. The output- and input-side driven gears 171*a* and 172*a*, and the upper and lower mechanism-side gears 173*b* and 174*b* mesh with each other and have substantially the same diameter.

The rotations of the upper and lower shafts 45*a* and 45*b* are increased in speed by, for example, about three times via the respective gears 45*c*, 45*d*, 171*a*, 172*a*, 173*a*, 173*b*, 174*a*, and 174*b* before being transmitted to the input and output shafts 171 and 172. In other words, the rotation angles of the upper and lower shafts 45*a* and 45*b* are increased by about three times in the input and output shafts 171 and 172, respectively.

Conversely, the rotations of the input and output shafts 171 and 172 are reduced in speed to, for example, about ⅓ via the respective gears mentioned above before being transmitted to the upper and lower shafts 45*a* and 45*b*, respectively. In other words, the rotation angles of the input and output shafts 171 and 172 are reduced to about ⅓ in the upper and lower shafts 45*a* and 45*b*, respectively.

The transmission of torque between the upper and lower shafts 45*a* and 45*b* is effected via the upper and lower relay gear shafts 173 and 174, and the input and output shafts 171 and 172. At this time, as described above, the gear ratio (reducing ratio) at which rotation is transmitted from the upper and lower shafts 45*a* and 45*b* to the input and output shafts 171 and 172, and the gear ratio at which rotation is transmitted from the input and output shafts 171 and 172 to the upper and lower shafts 45*a* and 45*b* cancel each other out. As a result, the transmission of torque between the upper and lower shafts 45*a* and 45*b* is performed at constant speed.

At this time, although play based on the space S1 between the protrusions 73*b* and the depressions 74*b* is produced between the input and output shafts 171 and 172 with respect to the rotational direction, by increasing or reducing the speed of transmission of rotation between the upper and lower shafts 45*a* and 45*b*, and the input and output shafts 171 and 172 as appropriate as described above, play with respect to the rotational direction between the upper and lower shafts 45*a* and 45*b* based on the above-mentioned play can be made smaller.

Since the relay gear shafts 173 and 174 are interposed between the steering shaft 45 and the input torque selecting mechanism 152, a broader range of values can be set as the reducing ratio between the upper and lower shafts 45*a* and 45*b*, and the input and output shafts 171 and 172 as compared with the case where the upper and lower drive gears 45*c* and 45*d*, and the output- and input-side driven gears 171*a* and 172*a* directly mesh with each other, thereby making it possible to keep the play with respect to the rotational direction of the steering shaft 45 even smaller.

As described above, with the steering damper apparatus according to the above-mentioned embodiment, the same effect as that of the third embodiment is attained. Furthermore, since the upper and lower shafts 45*a* and 45*b* of the steering shaft 45 are respectively connected to the input and output shafts 171 and 172 of the input torque selecting mechanism 152 via the gears 45*c*, 45*d*, 171*a*, 172*a*, 173*a*, 173*b*, 174*a*, and 174*b*, the input torque selecting mechanism 152 can be relatively freely disposed at the circumference of the steering shaft 45, and with the speed of transmission of rotation made constant between the upper and lower shafts 45*a* and 45*b* of the steering shaft 45, the speed of transmission of rotation between the input and output shafts 171 and 172 of the input torque selecting mechanism 152 and the steering shaft 45 can be increased and reduced as appropriate through the setting of the rear ratio.

When performing the transmission of torque between the upper and lower shafts 45*a* and 45*b* of the steering shaft 45 via the protrusion 73*b* and depression 74*b* of the input torque selecting mechanism 152, play based on the space S1 between the protrusion 73*b* and the depression 74*b* is produced between the upper and lower shafts 45*a* and 45*b* with respect to the rotational direction. At this time, since the rotation of the steering shaft 45 is increased in speed via the above-mentioned respective gears before being transmitted to the input torque selecting mechanism 152 (that is, the rotations of the input and output shafts 171 and 172 of the input torque selecting mechanism 152 are reduced in speed before being transmitted to the steering shaft 45), the play between the upper and lower shafts 45*a* and 45*b* based on the above-mentioned space S1 with respect to the rotational direction can be kept small.

Embodiment 6

Hereinafter, a sixth embodiment of the present invention will be described.

Figure 10:
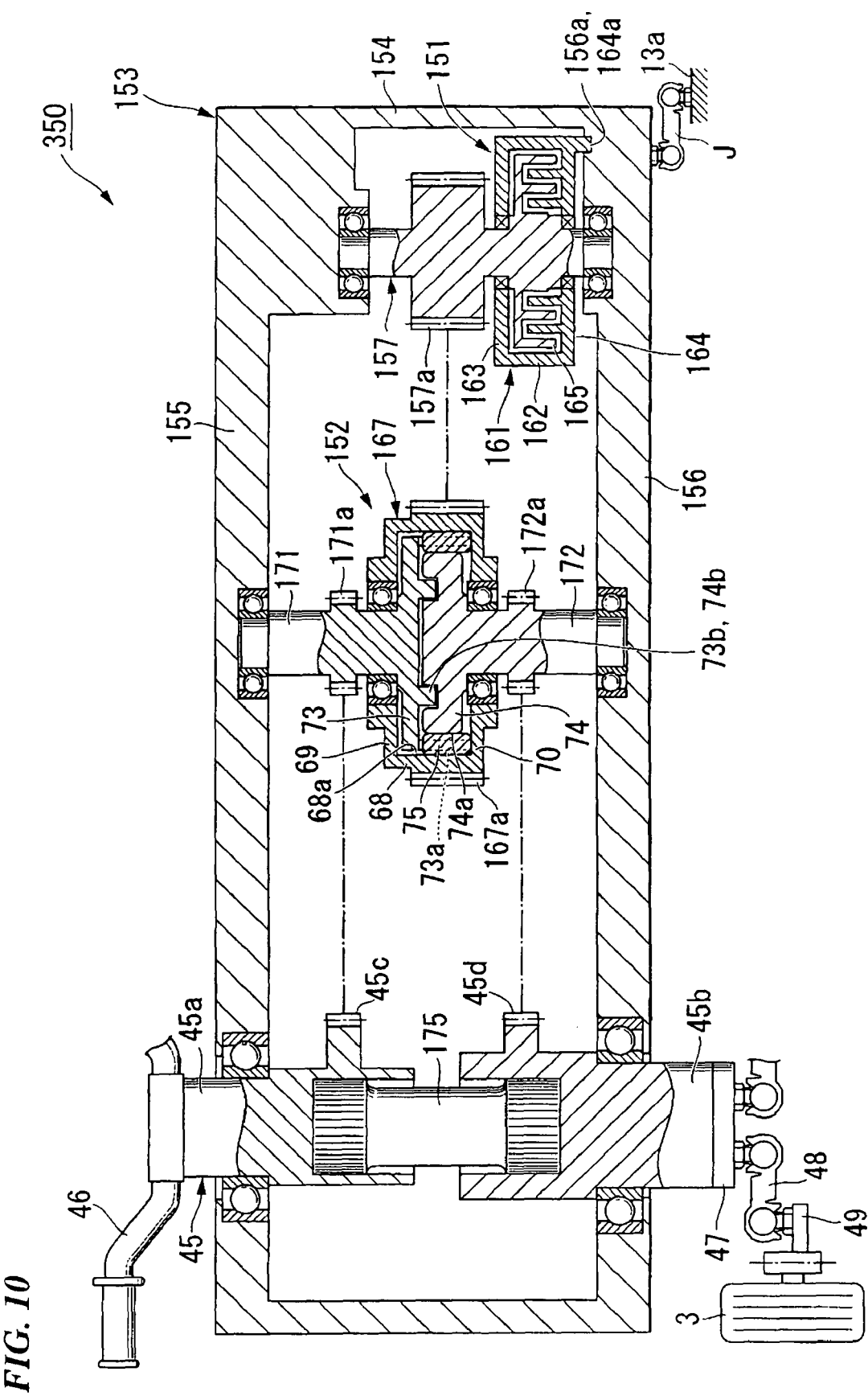
FIG. 10 is an explanatory view corresponding to FIG. 3, showing a sixth embodiment of the present invention.

As shown in FIG. 10, a steering damper apparatus according to this embodiment is principally different from the one according to the fifth embodiment in that the upper and lower relay gear shafts 173 and 174 are not provided, and the upper and lower shafts 45*a* and 45*b* are connected to each other via a torsion bar 175 that is coaxial with the upper and lower shafts 45*a* and 45*b*. Consequently, parts of this embodiment identical to those of the previous embodiments are denoted by the same reference symbols, and the description thereof will not be given.

In a steering damper unit 350, the upper and lower drive gears 45*c* and 45*d* are larger in diameter than the output- and input-side driven gears 171a and 172a, and the upper and lower drive gears 45c and 45d and the output- and input-side driven gears 171a and 172a directly mesh with each other. The rotations of the upper and lower shafts 45a and 45b are increased in speed as appropriate before being transmitted to the input and output shafts 171 and 172, and the rotations of the input and output shafts 171 and 172 are reduced in speed as appropriate before being transmitted to the upper and lower shafts 45a and 45b. Accordingly, as in the fifth embodiment, play with respect to the rotational direction between the upper and lower shafts 45a and 45b, which is produced on the basis of the space S1 between the protrusions 73b and depressions 74b of the input torque selecting mechanism 152, can be kept small.

The torsion bar 175 is made of a material whose torsional spring constant is lower than that of the upper and lower shafts 45a and 45b. Both ends of the torsion bar 175 are respectively coupled to the ends of the upper and lower shafts 45a and 45b by spline fitting or the like in a manner that does not allow relative rotation.

Although small play is produced between the upper and lower shafts 45a and 45b as described above, the torsional reaction force of the torsion bar 175 is exerted on the upper and lower shafts 45a and 45b upon their relative rotation based on this play, thereby providing a good sensation of the handlebar manipulation and also damping backlash of the steering mechanism.

As described above, with the steering damper apparatus according to the above-mentioned embodiment, the same effect as that of the fifth embodiment is attained. Furthermore, since the upper and lower shafts 45a and 45b of the steering shaft 45 are connected to each other via the torsion spring 175 whose torsional spring constant is lower than that of the upper and lower shafts 45a and 45b, the torsional reaction force of the torsion bar 175 is exerted at the time of relative rotation between the upper and lower shafts 45a and 45b, thereby making it possible to maintain good steering feel for the rider.

It is also possible to additionally use the upper and lower relay gear shafts 173 and 174 mentioned above in this embodiment as well.

Embodiment 7

Hereinafter, a seventh embodiment of the present invention will be described.

Figure 11:
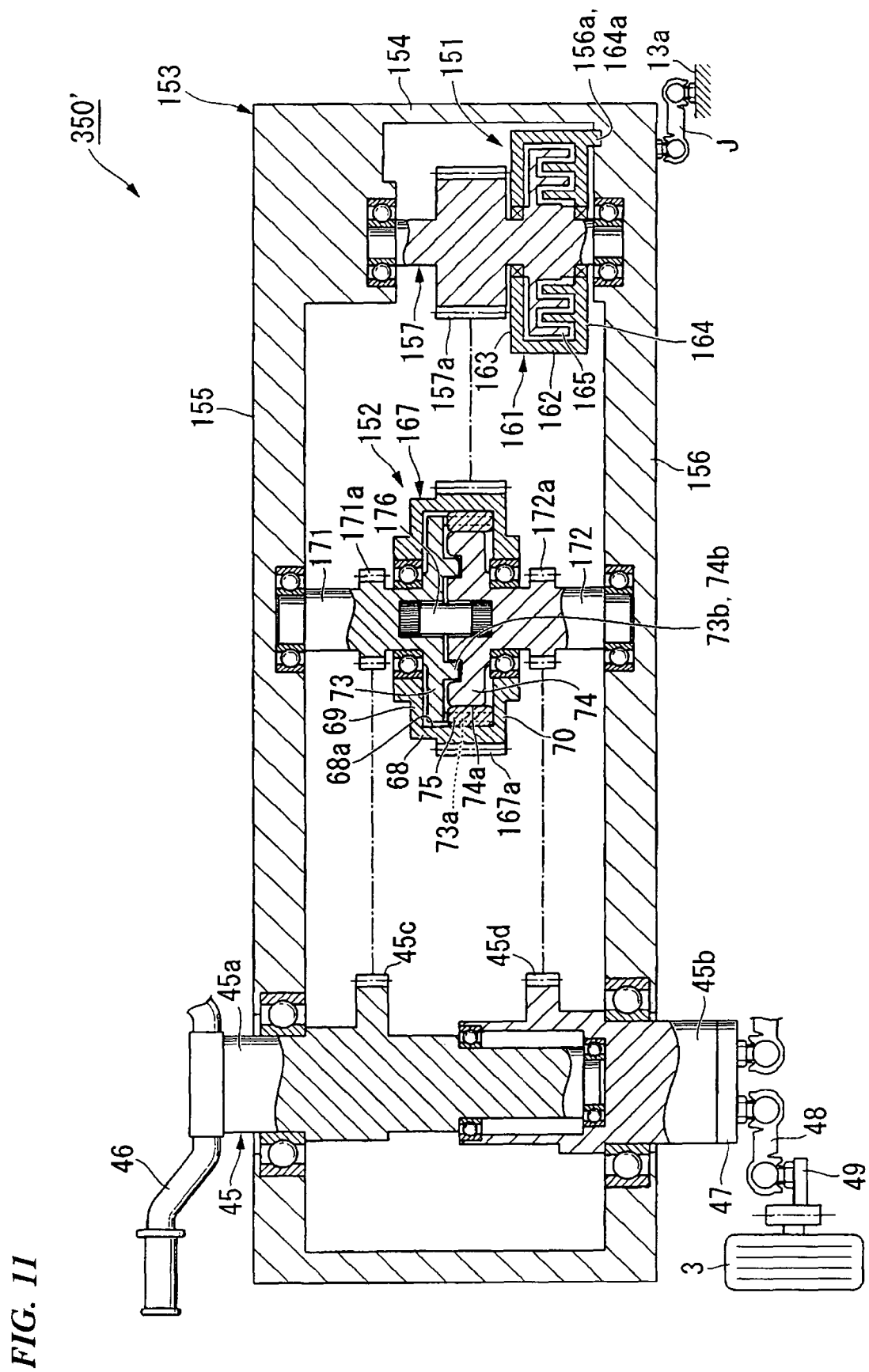
FIG. 11 is an explanatory view corresponding to FIG. 3, showing a seventh embodiment of the present invention.

As shown in FIG. 11, a steering damper apparatus according to this embodiment is principally different from the one according to the sixth embodiment in that the upper and lower shafts 45a and 45b are connected to each other in a manner that does not allow relative rotation, and the input and output shafts 171 and 172 are connected to each other via a torsion bar 176 that is coaxial with the input and output shafts 171 and 172. Consequently, parts of this embodiment identical to those of the previous embodiments are denoted by the same reference symbols, and the description thereof will not be given.

In a steering damper unit 350', the torsion bar 176 is made of a material whose torsional spring constant is lower than that of the input and output shafts 171 and 172. Both ends of the torsion bar 176 are respectively coupled to the ends of the input and output shafts 171 and 172 by spline fitting or the like in a manner that does not allow relative rotation.

Although small play based on the above-mentioned space S1 is produced between the input and output shafts 171 and 172 as described above, the torsional reaction force of the torsion bar 176 is exerted on the input and output shafts 171 and 172 upon their relative rotation based on this play. Accordingly, as in Embodiment 6, the torsional reaction force is transmitted to the upper and lower shafts 45a and 45b via each gear, a good sensation of the handlebar manipulation is provided, and backlash of the steering mechanism is damped, thereby making it possible to maintain good steering feel for the rider.

It is also possible to additionally use the above-mentioned torsion bar 175, and the above-mentioned upper and lower relay gear shafts 173 and 174 in this embodiment as well.

Embodiment 8

Hereinafter, an eighth embodiment of the present invention will be described.

Figure 12:
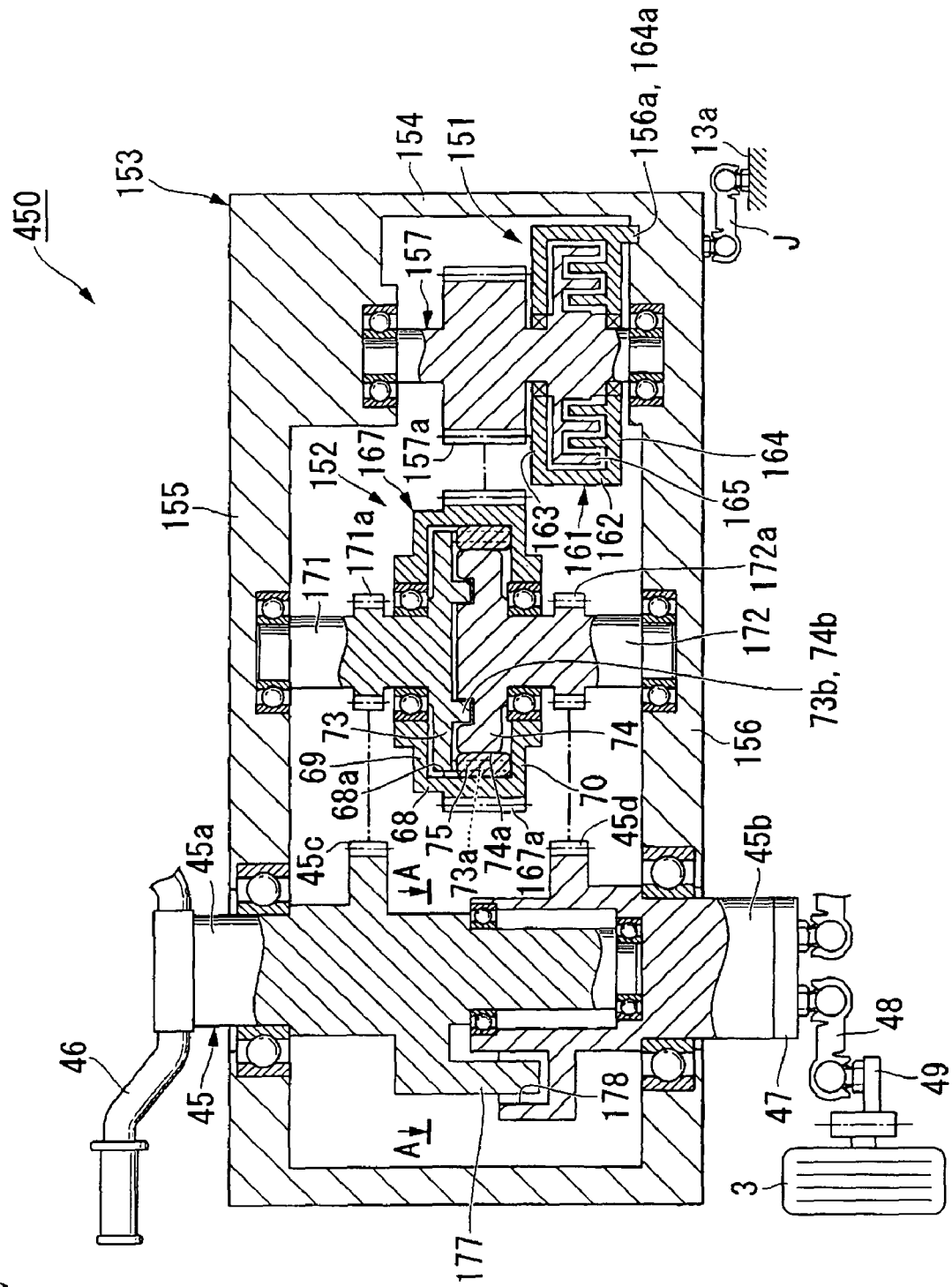
FIG. 12 is an explanatory view corresponding to FIG. 3, showing an eighth embodiment of the present invention.
Figure 13:
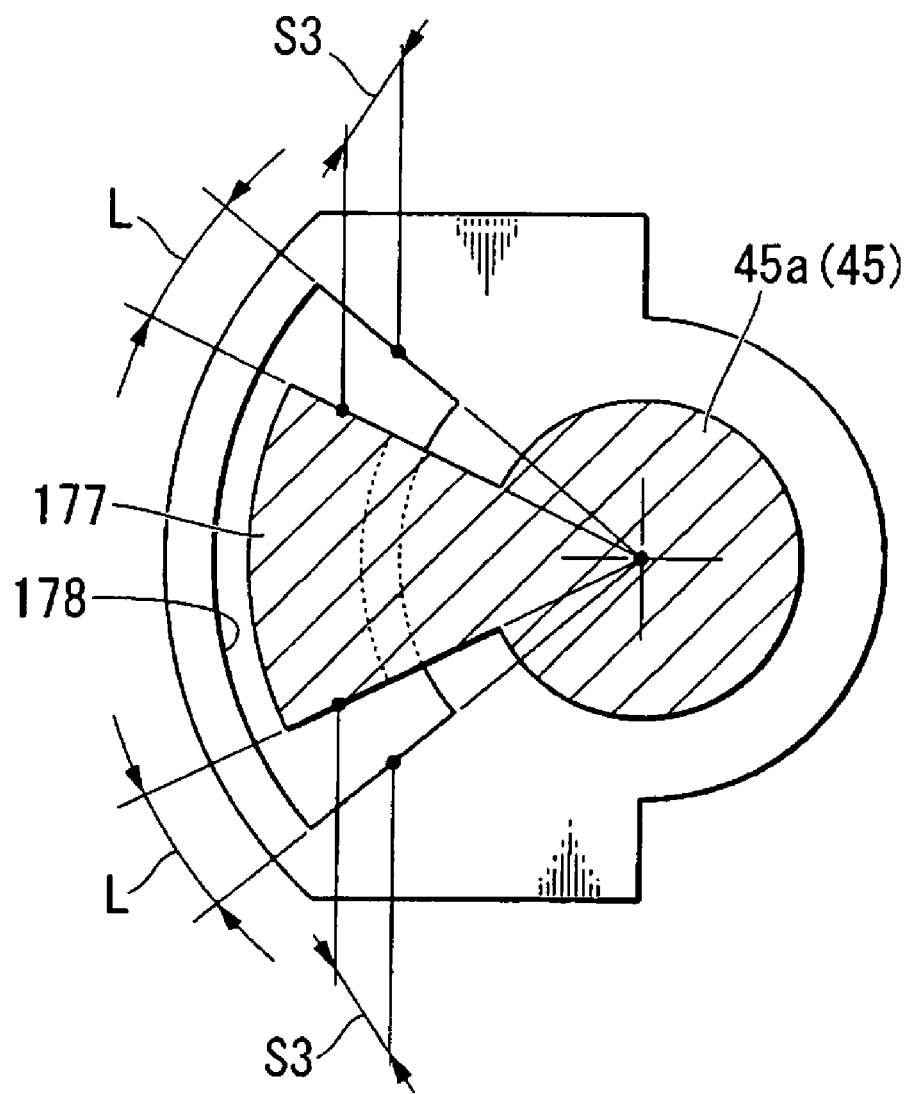
FIG. 13 is a sectional view taken along the line A-A of FIG. 12.

As shown in FIGS. 12 and 13, a steering damper apparatus according to this embodiment is principally different from the one according to the fifth embodiment in that the upper and lower relay gear shafts 173 and 174 are not provided, and the steering shaft 45 is provided with a steering-side protrusion 177 and a steering-side depression 178 for enabling the transmission of torque between the upper and lower shafts 45a and 45b. Consequently, parts of this embodiment identical to those of the previous embodiments are denoted by the same reference symbols, and the description thereof will not be given.

In a steering damper 450, the steering-side protrusion 177 extends to the lower shaft 45b side from the outer circumferential part of the upper shaft 45a. The steering-side depression 178, in which the steering-side protrusion 177 is loosely fitted, is formed in the outer circumferential part of the lower shaft 45b. A space S3 corresponding to the relative rotation angle L of each of the upper and lower shafts 45a and 45b is provided between the outer side surface of the steering-side protrusion 177 on either side in the shaft rotation direction, and the inner side surface of the steering-side depression 178 on either side in the shaft rotation direction (see FIG. 13).

In this case, the relative rotation angle L corresponds to the angle (hereinafter, referred to as L0) by which the input and output shafts 171 and 172 rotate relative to each other until the protrusions 73b and depressions 74b of the input torque selecting mechanism 152 come into abutment with each other (until the input and outputs shafts 171 and 172 are brought into engagement with each other in a manner that does not allow relative rotation) from the state in which they are spaced apart from each other by the space S1.

Accordingly, when the protrusions 73b and the depressions 74b are brought into engagement with each other so that transmission of torque is performed between the upper and lower shafts 45a and 45b via the protrusions 73b and the depressions 74b, the input and output shafts 171 and 172, and the like, the above-mentioned transmission of torque is performed also via the steering-side protrusion 177 and the steering-side depression 178 which are provided to the upper and lower shafts 45a and 45b. A load exerted on the engaging part (particularly the protrusions 73b) between the input and output shafts 171 and 172 is also distributed to the engaging part between the upper and lower shafts 45a and 45b.

It should be noted that a configuration may be adopted in which the relative rotation angle L is set to be slightly larger than the angle L0, and the transmission of torque between the upper and lower shafts 45a and 45b is normally effected by the engagement between the protrusions 73b and the depressions 74b, whereas in situations such as when excessive rotational torque is inputted to the steering shaft 45, for example, the steering-side protrusion 177 and the steering-side depression 178 can be brought into engagement with other before the engaging part (particularly the protrusions 73b) between the input and output shafts 171 and 172 undergoes deformation (in other words, the steering-side protrusion 177 and the steering-side depression 178 each serve as a stopper at the time of an excessive input).

As described above, with the steering damper apparatus according to the above-mentioned embodiment, the same effect as that of the fifth embodiment is attained. Furthermore, since torque is transmitted between the upper and lower shafts 45*a* and 45*b* also via the steering-side protrusion 177 and the steering-side depression 178 that are provided in the steering shaft 45, so the load applied to the engaging part between the input and output shafts 171 and 172 is suppressed, whereby the performance required of the input torque selecting mechanism 152 can be reduced to achieve a reduction in size and weight as well as a reduction in cost.

It is also possible to use the upper and lower relay gear shafts 173 and 174, or use the torsion bars 175 and 176 in this embodiment as well.

Embodiment 9

Hereinafter, a ninth embodiment of the present invention will be described.

Figure 14:
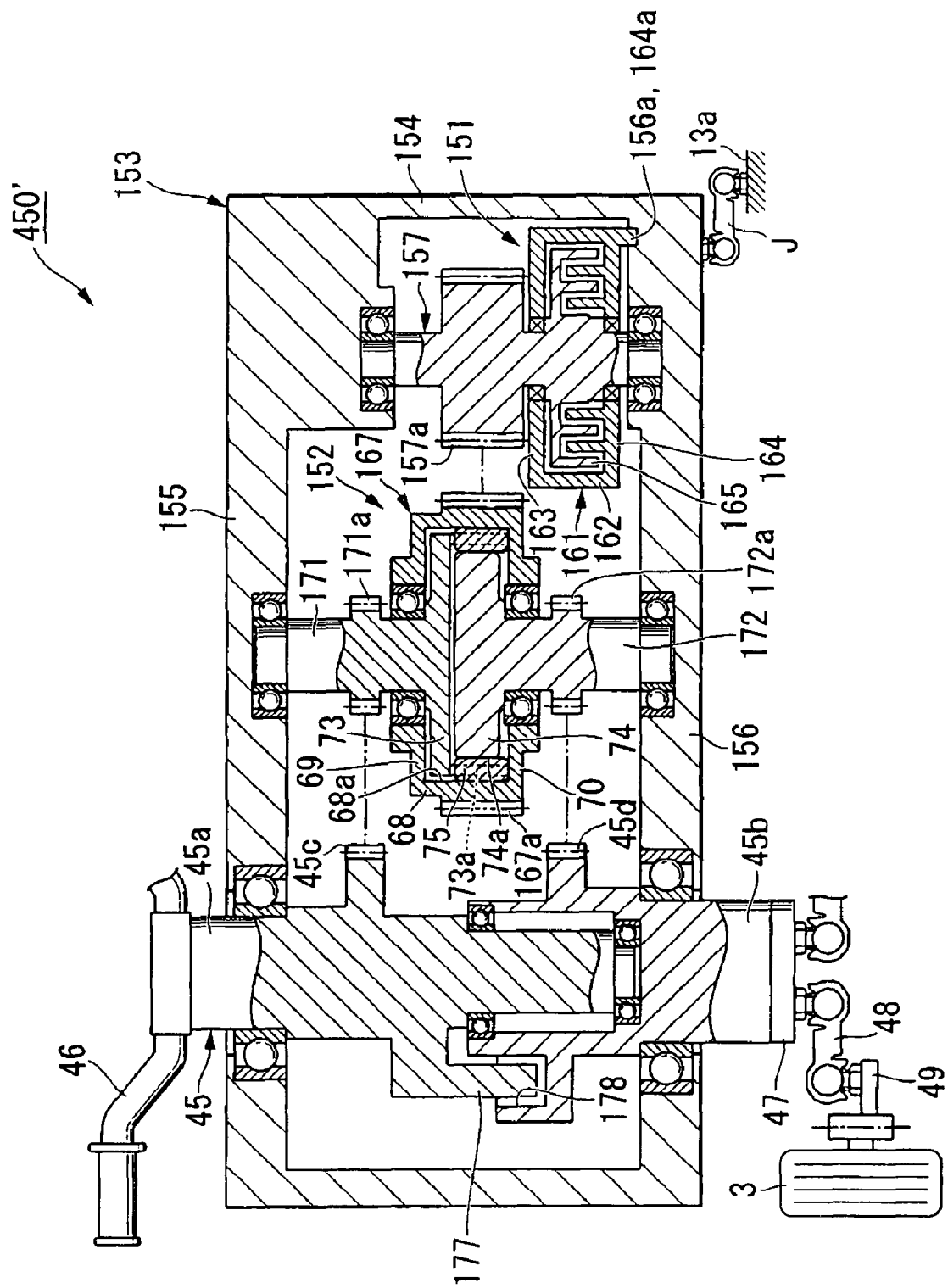
FIG. 14 is an explanatory view corresponding to FIG. 3, showing a ninth embodiment of the present invention.

As shown in FIG. 14, a steering damper apparatus according to this embodiment is principally different from the one according to the eighth embodiment in that the depressions 74*b* and protrusions 73*b* of the input torque selecting mechanism 152 are not provided. Consequently, parts of this embodiment identical to those of the previous embodiments are denoted by the same reference symbols, and the description thereof will not be given.

In a steering damper unit 450', the above-mentioned relative rotation angle L is set as the angle L0. Upon input of rotational torque from the handlebar 46, the wedging engagement of the respective rollers 75 is released so as to allow relative rotation between each of the plate parts 73 and 74 and the housing 167 (see FIG. 4B), and the steering-side protrusion 177 and the steering-side depression 178 are brought into engagement with each other, thereby allowing the transmission of torque between the upper and lower shafts 45*a* and 45*b* to be effected in a non-damping state where no damping force is being applied from the damper 151.

On the other hand, upon input of rotational torque from the front wheels 3, the respective rollers 75 are brought into wedging engagement so that the output-side plate 74 and the housing 167 are brought into engagement with each other in a manner not allowing relative rotation (see FIG. 4C) and, in the same manner as described above, the steering-side protrusion 177 and the steering-side depression 178 are brought into engagement with each other, thereby allowing the transmission of torque between the upper and lower shafts 45*a* and 45*b* to be effected in a damping state where a damping force is being applied from the damper 151.

That is, the transmission of torque between the upper and lower shafts 45*a* and 45*b* is effected solely by the steering-side protrusion 177 and the steering-side depression 178, instead of the protrusions 73*b* and the depressions 74*b*.

As described above, with the steering damper apparatus according to the above-mentioned embodiment, the same effect as that of the fifth embodiment is attained. Furthermore, since the transmission of torque between the upper and lower shafts 45*a* and 45*b* is effected solely via the steering-side protrusion 177 and the steering-side depression 178 that are provided in the steering shaft 45, the protrusions 73*b* and depressions 74*b* of the input torque selecting mechanism 152 can be eliminated, thereby achieving a reduction in the size and weight of the input torque selecting mechanism 152 as well as a reduction in cost.

It is also possible to use the upper and lower relay gear shafts 173 and 174, or use the torsion bar 175 in this embodiment as well.

Embodiment 10

Hereinafter, a tenth embodiment of the present invention will be described.

Figure 15:
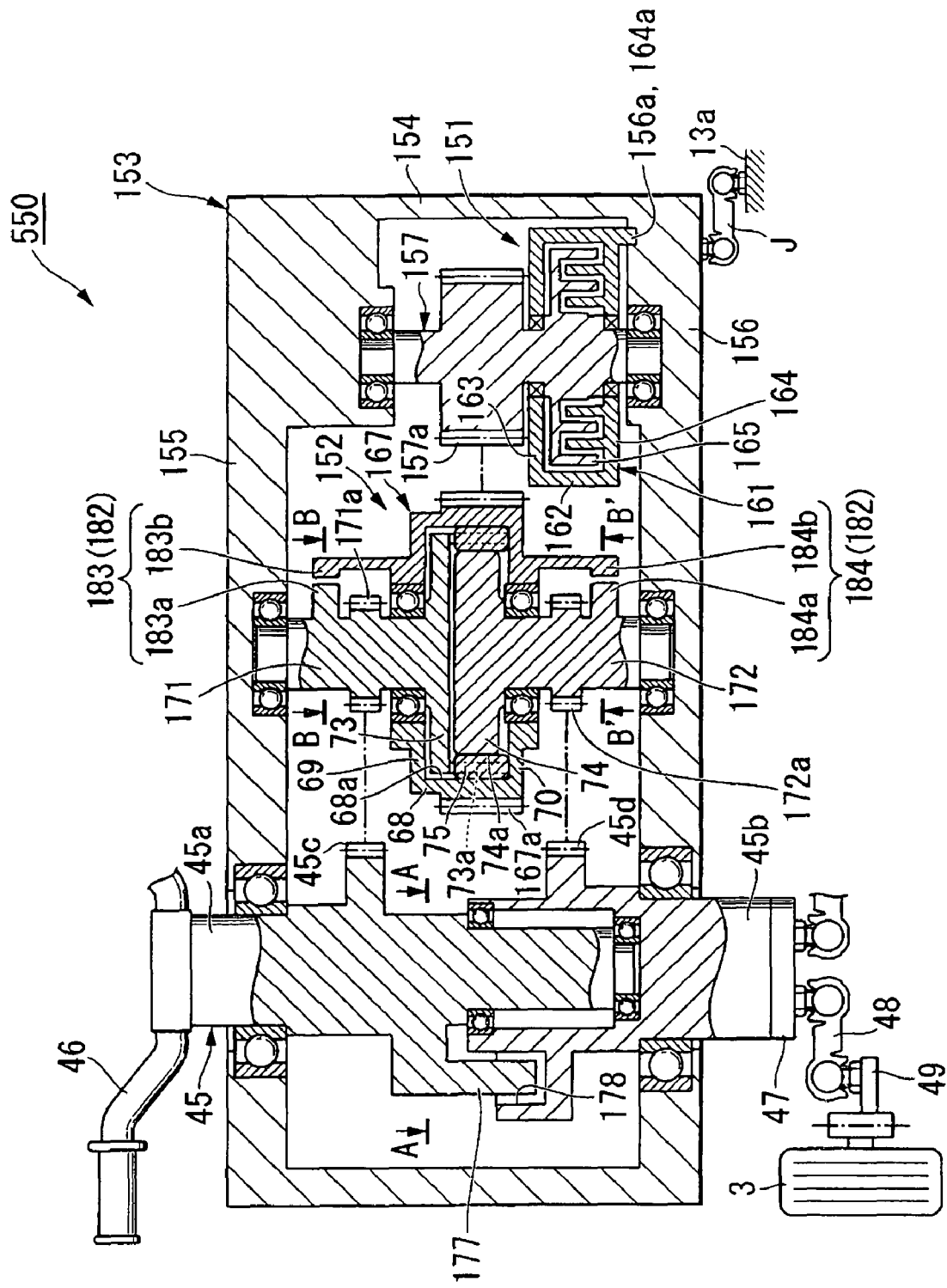
FIG. 15 is an explanatory view corresponding to FIG. 3, showing a tenth embodiment of the present invention.
Figure 16:
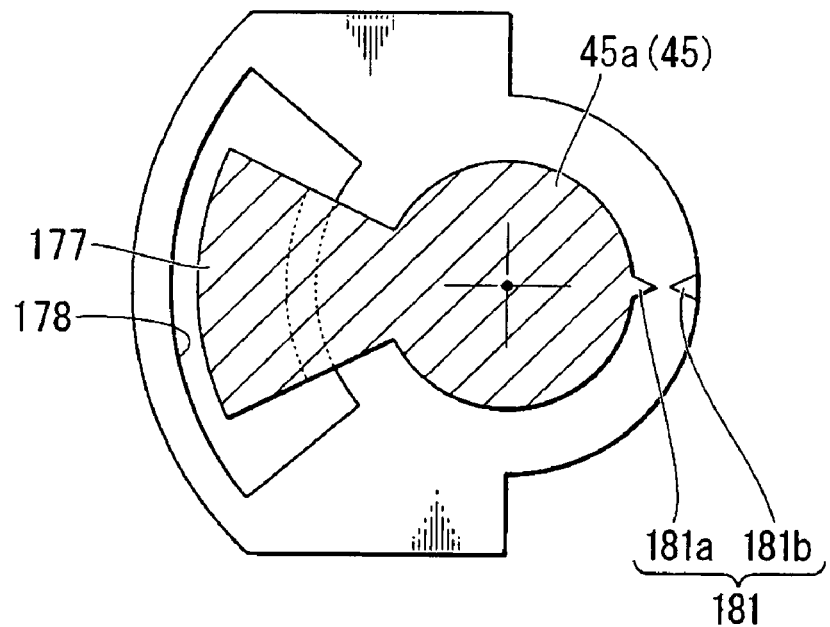
FIG. 16 is a sectional view taken along the line A-A of FIG. 15.
Figure 17:
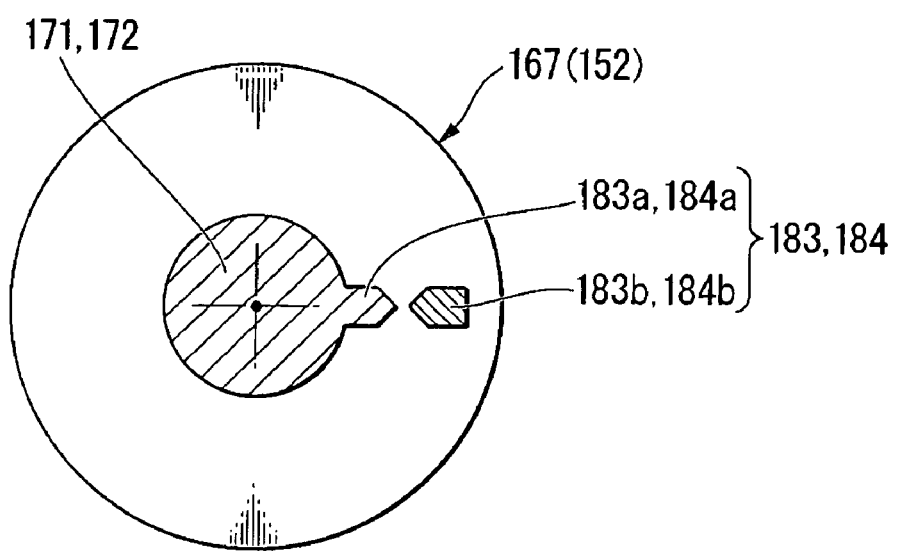
FIG. 17 is a sectional view taken along the line B-B (B'-B') of FIG. 15.

As shown in FIGS. 15 to 17, a steering damper apparatus according to this embodiment is principally different from the one according to the ninth embodiment in that the steering damper apparatus includes a steering-side positioning mechanism 181 for determining the neutral position in the rotating direction between the upper and lower shafts 45*a* and 45*b*, and a mechanism-side positioning mechanism 182 for determining the neutral position in the rotating direction between the input and output shafts 171 and 172. Consequently, parts of this embodiment identical to those of the previous embodiments are denoted by the same reference symbols, and the description thereof will not be given.

As shown in FIG. 16, in a steering damper unit 550, the steering-side positioning mechanism 181 is located near the steering-side protrusion 177 and the steering-side depression 178, and includes an indicator 181*a* and a mark 181*b* respectively provided in the upper shaft 45*a* and the lower shaft 45*b* to indicate the reference positions in the rotating direction of the upper and lower shafts 45*a* and 45*b*. When the indicator 181*a* and the mark 181*b* are aligned as seen in the axial direction, the above-mentioned space S3 is secured on either side of the steering-side protrusion 177 inside the steering-side depression 178, thereby determining the neutral position in the rotating direction of the upper and lower shafts 45*a* and 45*b* (a state where the upper and lower shafts 45*a* and 45*b* are located at the intermediate position within the range of possible relative rotation).

On the other hand, as shown in FIG. 17, the mechanism-side positioning mechanism 182 includes input- and output-side positioning mechanisms 183 and 184 provided in upper and lower parts of the housing 167.

The input-side positioning mechanism 183 includes an indicator 183*a* and a mark 183*b* that indicate the reference positions in the rotating direction of the input shaft 171 and housing 167. The output-side positioning mechanism 184 includes an indicator 184*a* and a mark 184*b* that indicate the reference positions in the rotating direction of the output shaft 172 and housing 167. By aligning the indicator 183*a* and mark 183*b* of the input-side positioning mechanism 183 as seen in the axial direction, the relative rotation position of the input shaft 171 with respect to the housing 167 is determined, and by aligning the indicator 184*a* and mark 184*b* of the output-side positioning mechanism 184 as seen in the axial direction, the relative rotation position of the output shaft 172 with respect to the housing 167 is determined. That is, the mechanism-side positioning mechanism 182 serves to determine the relative rotation positions of the input and output shafts 171 and 172 with respect to the housing 167.

At this time, within the input torque selecting mechanism 152, the space S2 is formed between each of the rib parts 73*a* and each of adjacent rollers 75 located on both sides thereof (corresponding to a state in which the space S1 is formed between the projections 73*b* and the depressions 74*b*), whereby the neutral position in the rotating direction of the input and output shafts 171 and 172 (a state where the input and output shafts 171 and 172 are located at the intermediate position within the range of possible relative rotation) is determined.

When assembling the steering shaft 45 and the input torque selecting mechanism 152 together, the neutral position of the upper and lower shafts 45a and 45b, and the neutral position of the input and output shafts 171 and 172 are determined, thereby preventing displacement between the respective neutral positions.

As described above, with the steering damper apparatus according to the above-mentioned embodiment, the same effect as that of the ninth embodiment is attained. Furthermore, since the input torque selecting mechanism 152 includes the mechanism-side positioning mechanism 182 for determining the neutral position in the rotating direction between the input and output shafts 171 and 172, and the steering shaft 45 includes the steering-side positioning mechanism 181 for determining the neutral position in the rotating direction between the upper and lower shafts 45a and 45b, even when, in particular, the steering shaft 45 and the input torque selecting mechanism 152 are disposed in a non-coaxial manner, it is possible to prevent a rotational phase difference (displacement of the neutral position) from occurring between the steering shaft 45 and the input torque selecting mechanism 152.

It is also possible to use the protrusions 73b and the depressions 74b, use the upper and lower relay gear shafts 173 and 174, or use the torsion bars 175 and 176 in this embodiment as well.

Embodiment 11

Hereinafter, an eleventh embodiment of the present invention will be described.

Figure 18:
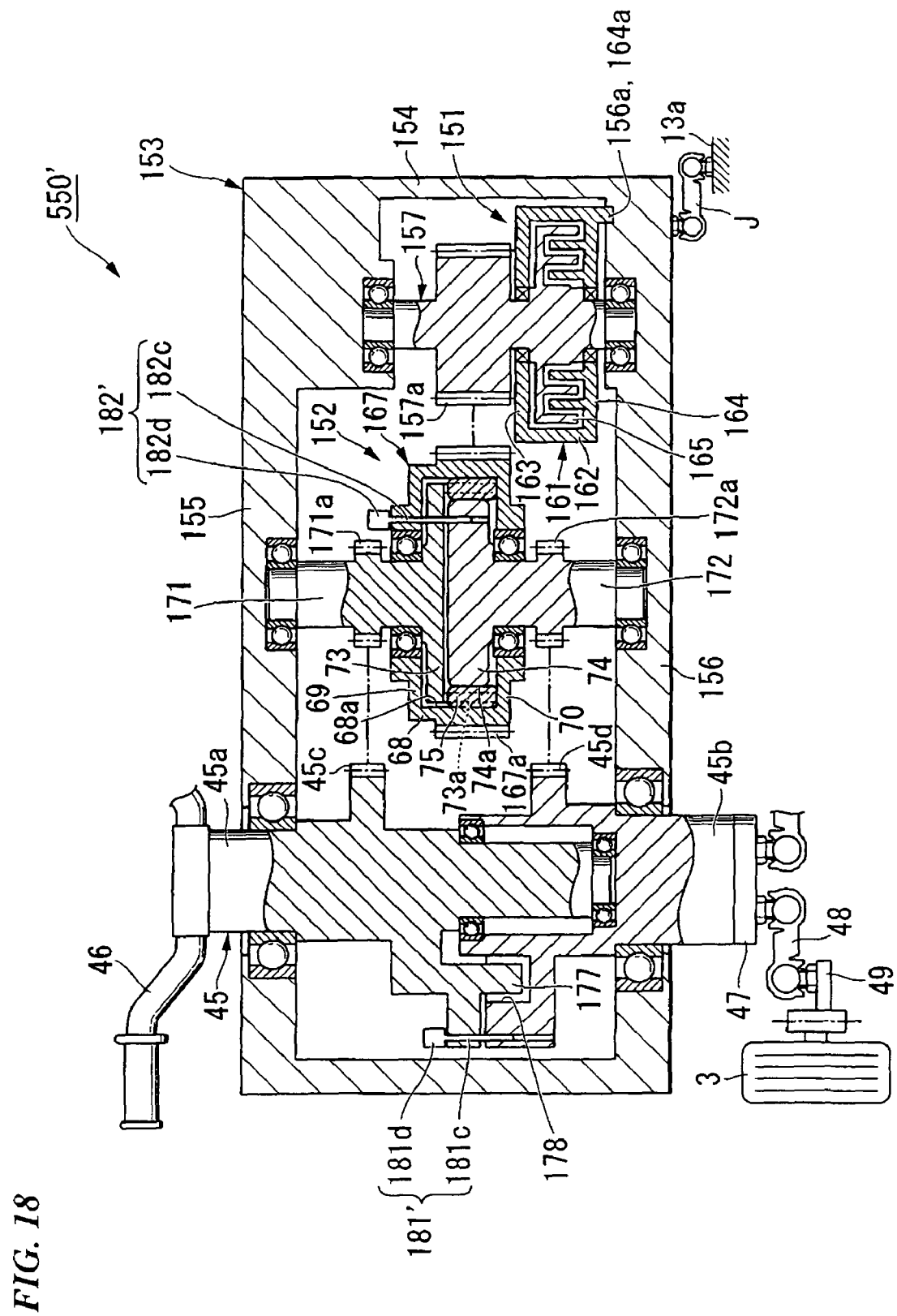
FIG. 18 is an explanatory view corresponding to FIG. 3, showing an eleventh embodiment of the present invention.

As shown in FIG. 18, a steering damper apparatus according to this embodiment is principally different from the one according to the tenth embodiment in that a steering-side positioning mechanism 181' includes a through-hole 181c, which axially extends through the steering-side protrusion 177 and the steering-side depression 178, and a pin 181d passed through the through-hole 181c, and a mechanism-side positioning mechanism 182' includes a through-hole 182c, which axially extends through the respective plate parts 73 and 74 of the input and output shafts 171 and 172 and the housing 167, and a pin 182d passed through the through-hole 182c. Consequently, parts of this embodiment identical to those of the previous embodiments are denoted by the same reference symbols, and the description thereof will not be given.

In a steering damper unit 550', by passing the pin 181d through the through-hole 181c in the steering-side positioning mechanism 181', the neutral position in the rotating direction of the upper and lower shafts 45a and 45b is determined, and by passing the pin 182d through the through-hole 182c in the mechanism-side positioning mechanism 182', the neutral position in the rotating direction of the input and output shafts 171 and 172 is determined. After assembling the steering shaft 45 and the input torque selecting mechanism 152 together in this state, the pins 181d and 182d of the respective positioning mechanisms 181' and 182' are removed, whereby, as in the tenth embodiment, the assembling of the upper and lower shafts 45a and 45b, and the input shafts 171 and 172 is completed in a state where displacement between the respective neutral positions of these components is prevented.

It is also possible to use the protrusions 73b and the depressions 74b, use the upper and lower relay gear shafts 173 and 174, or use the torsion bars 175 and 176 in this embodiment as well.

Embodiment 12

Hereinafter, a twelfth embodiment of the present invention will be described.

Figure 19:
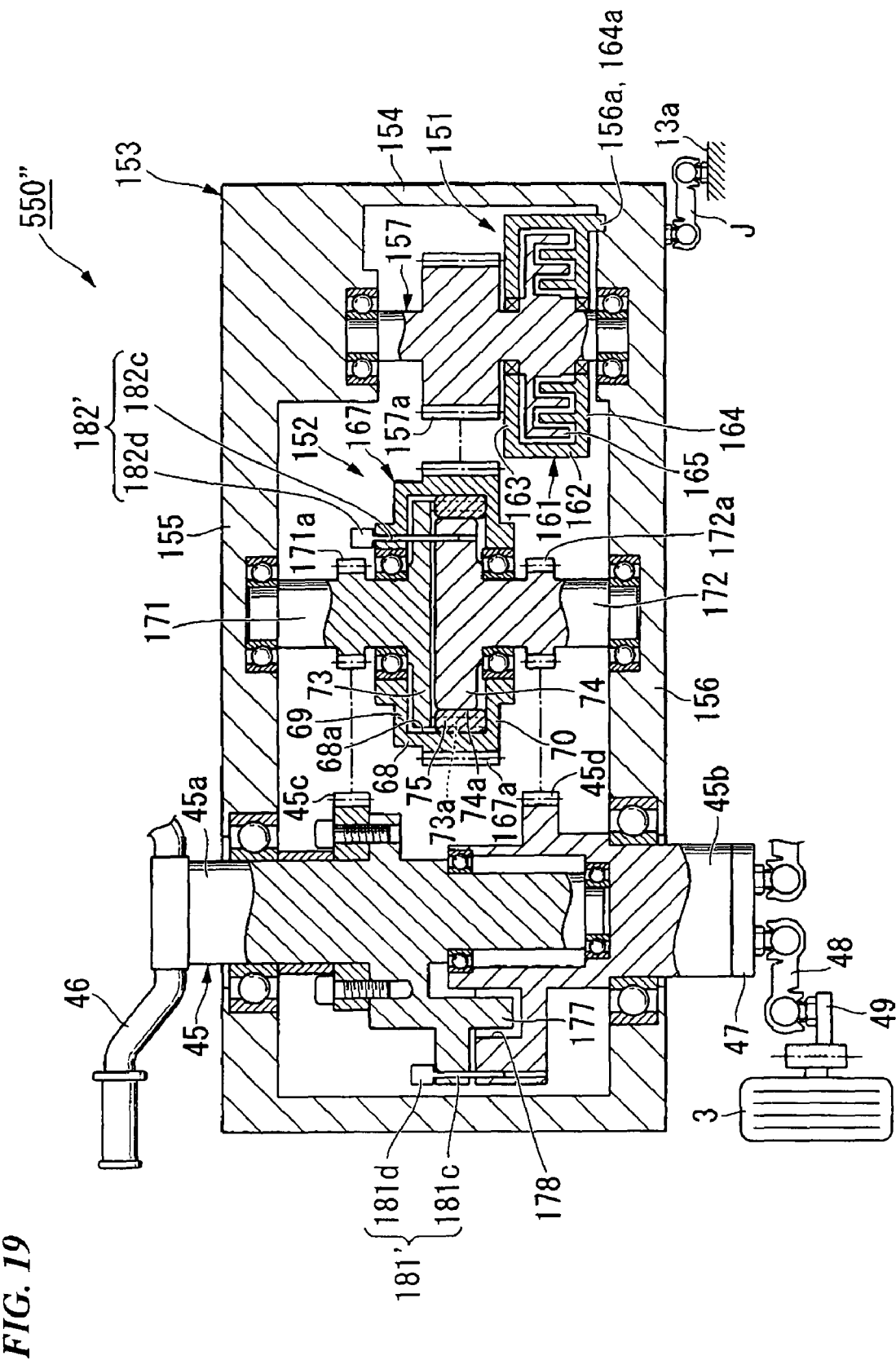
FIG. 19 is an explanatory view corresponding to FIG. 3, showing a twelfth embodiment of the present invention.

As shown in FIG. 19, a steering damper apparatus according to this embodiment is principally different from the one according to the eleventh embodiment in that, for example, the upper shaft 45a and the upper drive gear 45c are formed as separate components, and these components are integrally coupled together by bolting or the like, thereby making it possible to adjust the relative rotation angle between the upper shaft 45a and the upper drive gear 45c. Consequently, parts of this embodiment identical to those of the previous embodiments are denoted by the same reference symbols, and the description thereof will not be given.

In a steering damper unit 550", when assembling the steering shaft 45 and the input torque selecting mechanism 152 together in a state where the neutral positions of the upper and lower shafts 45a and 45b and input and output shafts 171 and 172 are determined as described above, by making at least one of the above-mentioned gears 45c, 45d, 171a, 172a, 173a, 173b, 174a, and 174b, which connect the upper and lower shafts 45a and 45b and the input and output shafts 171 and 172 to each other, be adjustable in angle about its axis, even when dimensional tolerances of respective parts have accumulated and become large, such tolerances can be absorbed. That is, the same effect as that that of the tenth embodiment is attained, and the dimensional tolerance of each part can be increased, thereby allowing an inexpensive part processing method to be selected to achieve a reduction in cost.

In this embodiment, there are no limitations on how the steering-side positioning mechanism and the mechanism-side positioning mechanism are constructed, and these mechanisms may not be used. Furthermore, it is also possible to use the protrusions 73b and the depressions 74b, use the upper and lower relay gear shafts 173 and 174, or use the torsion bars 175 and 176 in this embodiment as well.

Meanwhile, the present invention is not limited to the above-described embodiments. For example, the input torque selecting mechanism 152 may be of an electric type, or the damper may be of a vane type. Also, the present invention may be applied to vehicles other than a saddle-ride type four-wheeled vehicle. For example, the present invention may be mounted to a steering head of a motorcycle.

Furthermore, in the fifth to twelfth embodiments mentioned above, as in the second embodiment modified from the first embodiment (and as in the fourth embodiment modified from the third embodiment), it is also possible to mount the steering damper unit upside down.

The constructions of the above-described embodiments are merely illustrative of an example of the present invention. It is therefore a matter of course that the present invention is applicable not only to vehicles but also to general machinery, and it is needless to mention that various modifications can be made to the present invention without departing from the gist of the invention.

What is claimed is:

1. A steering damper apparatus comprising:
a body frame;
wheels suspended by the body frame;
a steering shaft rotatably supported by the body frame, the steering shaft having a lower shaft connected to the wheel side;
a handlebar connected to an upper shaft of the steering shaft for rotating the steering shall to steer the wheels; and
a damper for damping the rotation of the steering shaft,
wherein the rotation of the steering shaft is damped by the damper only when there is an input from either the handlebar or the wheels,
wherein one of the upper and lower shafts of the steering shaft includes a steering-side protrusion, and
the other of the upper and lower shafts of the steering shaft includes a steering-side depression in which the steering-side protrusion is loosely fitted with a predetermined space therebetween, and
wherein when the upper and lower shafts rotate relative to each other, the steering-side protrusion and the steering-side depression are brought into abutment with each other so that torque is transmitted between the upper and lower shafts via the steering-side protrusion and the steering-side depression,
wherein the one of the upper and lower shafts having the protrusion is also formed with a rib located in a space between an outer periphery of the other of the upper and lower shafts and an inner circumferential side of the housing.

2. A steering damper apparatus comprising:
a body frame;
wheels suspended by the body frame;
a handlebar for steering the wheels; and
a damper for damping the rotation of the handlebar,
wherein the steering damper apparatus further includes an input torque selecting mechanism having an input shaft, an output shaft, and a housing for rotatably supporting the respective shafts, the input torque selecting mechanism being constructed such that, when a torque is inputted from the input shaft, the input shaft rotates the output shaft relative to the housing, and, on the other hand, when a torque is inputted from the output shaft, the output shah rotates the input shaft and the housing, and
wherein one of the input shaft and the output shaft of the input torque selecting mechanism is connected to the handlebar side, the other of the input shaft and the output shaft of the input torque selecting mechanism is connected to the wheel side, the housing is connected to the damper, the respective shafts are rotated to steer the wheels, and, when the housing is rotated, the rotation of the housing is damped by the damper,
wherein one of the input and output shahs of the input torque selecting mechanism includes a plate part having a protrusion, and
the other of the input and output shafts of the input torque selecting mechanism includes a plate part with a depression extending only part way through the plate part in which the protrusion is loosely fitted with a predetermined space therebetween, and
wherein when the input and output shafts rotate relative to each other, the protrusion and the depression are brought into abutment with each other so that torque is transmitted between the upper and lower shafts of the steering shaft via the protrusion and the depression,
wherein each of the protrusion and the depression has an axis extending parallel to a longitudinal axis of the input and output shafts.

3. The steering damper apparatus according to claim 2, wherein the damper and the housing of the input torque selecting mechanism are connected with each other via gears.

4. The steering damper apparatus according to claim 2, further comprising a steering shaft rotatably supported by the body frame, one end of the steering shall being connected to the wheel side, the other end of the steering shaft being connected to the handlebar side,
wherein at least a portion of the steering shaft constitutes the input shaft or the output shaft of the input torque selecting mechanism.

5. The steering damper apparatus according to claim 2, wherein the input shaft of the input torque selecting mechanism is connected to the handlebar side.

6. The steering damper apparatus according to claim 2, wherein the input shaft of the input torque selecting mechanism is connected to the wheel side.

7. The steeping damper apparatus according to claim 2, further comprising a steering shaft rotatably supported by the body frame, one end of the steering shaft being connected to the wheel side, the other end of the steering shaft being connected to the handlebar side,
wherein the steering shaft includes an upper shaft connected to the handlebar side, and a lower shaft connected to the wheel side, the upper and lower shafts being respectively connected to either the input or output shaft of the input torque selecting mechanism via gears.

8. The steering damper apparatus according to claim 7, wherein the speeds of rotation of the upper and lower shafts of the steering shaft are increased by the gears before being transmitted to the input and output shafts of the input torque selecting mechanism.

9. The steering damper apparatus according to claim 7, wherein the upper and lower shafts of the steering shaft are coupled to each other via an elastic member whose torsional spring constant is lower than that of the upper and lower shafts.

10. The steering damper apparatus according to claim 7, wherein the input and output shafts of the input torque selecting mechanism are coupled to each other via an elastic member whose torsional spring constant is lower than that of the input and output shafts.

11. The steering damper apparatus according to claim 7, wherein the input torque selecting mechanism has positioning means for determining a neutral position in a rotating direction between the input and output shafts.

12. The steering damper apparatus according to claim 7, wherein the steering shaft has steering-side positioning means for determining a neutral position in a rotating direction between the upper and lower shafts.

13. A damper apparatus comprising:
an input torque selecting mechanism, which has an input shall, an output shaft, and a housing for rotatably supporting the respective shafts, the input torque selecting mechanism being constructed such that, when a torque is inputted from the input shaft, the input shaft rotates the output shaft relative to the housing, and when a torque is inputted from the output shaft, the output shaft rotates the input shaft and the housing;
a damper connected to the housing for damping the rotation of the housing; and a shaft disposed in a coaxial manner with respect to the input shaft and the output shaft, wherein the shaft is divided into upper and lower shafts, wherein one of the input and output shafts of the input torque selecting mechanism includes a plate part having a protrusion, and the other of the input and output shafts of the input torque selecting mechanism includes a plate part having a depression extending only part way through the plate part in which the protrusion is loosely fitted with a predetermined space therebetween, the protrusion and the depression being brought into abutment with each other when the input and output shafts rotate relative to each other, so that torque is transmitted between the upper and lower shafts via the protrusion and the depression wherein each of the protrusion and the depression has an axis extending parallel to a longitudinal axis of the input and output shafts.

14. The damper apparatus according to claim 13, wherein the upper and lower shafts are respectively connected to either the input or output shaft of the input torque selecting mechanism via gears.

15. The damper apparatus according to claim 14;

wherein one of the upper and lower shafts includes a shaft-side protrusion, and the other of the upper and lower shafts includes a shall-side depression in which the shaft-side protrusion is loosely fitted with a predetermined space therebetween, the shall-side protrusion and the shaft-side depression being brought into abutment with each other when the upper and lower shafts rotate relative to each other, so that torque is transmitted between the upper and lower shafts also via the shaft-side protrusion and the shaft-side depression.

16. The damper apparatus according to claim 14, wherein the input torque selecting mechanism has positioning means for determining a neutral position in a rotating direction between the input and output shafts.

* * * * *